United States Patent
Longe et al.

(10) Patent No.: US 7,966,003 B2
(45) Date of Patent: Jun. 21, 2011

(54) DISAMBIGUATING AMBIGUOUS CHARACTERS

(75) Inventors: Michael R. Longe, Seattle, WA (US); Ethan R. Bradford, Seattle, WA (US); David J. Kay, Seattle, WA (US); Pim Van Meurs, Kenmore, WA (US)

(73) Assignee: Tegic Communications, Inc., Seattle, WA (US)

( * ) Notice: Subject to any disclaimer, the term of this patent is extended or adjusted under 35 U.S.C. 154(b) by 1468 days.

(21) Appl. No.: 11/177,477

(22) Filed: Jul. 11, 2005

(65) Prior Publication Data
US 2006/0013487 A1    Jan. 19, 2006

Related U.S. Application Data

(60) Provisional application No. 60/586,502, filed on Jul. 9, 2004.

(51) Int. Cl.
*H04M 3/42* (2006.01)
*H04W 24/00* (2009.01)
*G06F 7/00* (2006.01)
*G06F 17/30* (2006.01)
*G06F 15/16* (2006.01)

(52) U.S. Cl. .................. 455/414.1; 455/456.1; 707/766; 707/767; 707/768; 709/230; 709/231

(58) Field of Classification Search ............... 455/414.1, 455/456.1–456.6, 414.3, 414.4; 707/1–4, 707/759–769; 709/230, 231
See application file for complete search history.

(56) References Cited

U.S. PATENT DOCUMENTS

| | | | |
|---|---|---|---|
| 4,650,927 A | 3/1987 | James | |
| 4,812,990 A | 3/1989 | Adams et al. | |
| 4,817,129 A | 3/1989 | Riskin | |
| 5,122,961 A | 6/1992 | Toyama et al. | |
| 5,179,519 A | 1/1993 | Adachi et al. | |
| 5,220,507 A | 6/1993 | Kirson | |
| 5,243,528 A | 9/1993 | Lefebvre | |
| 5,311,173 A | 5/1994 | Komura et al. | |
| 5,504,482 A | 4/1996 | Schreder | |

(Continued)

FOREIGN PATENT DOCUMENTS

EP    1 054 329    11/2000

(Continued)

OTHER PUBLICATIONS

"Google Zeitgeist—Search patterns, trends, and surprises according to Google," Jan. 2003, http://www.google.com/press/zeitgeist.html, 2 pages.
"Index of /tarvizo/OldFiles/elips/tnt-2.4", Jul. 2, 2001, TNT, http://web.mit.edu/tarvizo/OldFiles/elips/tnt-2.4.
Automated feature of Internet Explorer, www.geocities.com/technofundo/tech/web/ie_autocomplete.html, pp. 1-6.

(Continued)

*Primary Examiner* — George Eng
*Assistant Examiner* — Wesley L Kim
(74) *Attorney, Agent, or Firm* — Chapin IP Law, LLC; Barry W. Chapin, Esq.

(57) ABSTRACT

In one general sense, information may be presented to a user by receiving one or more ambiguous characters that may be resolved to one of at least two disambiguated characters, exchanging at least one of the ambiguous characters with a host, receiving, from the host, results that reflect disambiguated terms related to the ambiguous characters exchanged with the host, rendering the results in a manner enabling the user to perceive which of the disambiguated terms will be used upon user selection of an aspect of the results, and enabling the user to select an aspect of the results to effect use of a corresponding one of the disambiguated terms.

34 Claims, 19 Drawing Sheets

U.S. PATENT DOCUMENTS

| | | | |
|---|---|---|---|
| 5,508,930 A | 4/1996 | Smith, Jr. | |
| 5,513,110 A | 4/1996 | Fujita et al. | |
| 5,559,707 A | 9/1996 | DeLorme et al. | |
| 5,568,390 A | 10/1996 | Hirota et al. | |
| 5,592,538 A | 1/1997 | Kosowsky et al. | |
| 5,615,116 A | 3/1997 | Gudat et al. | |
| 5,712,788 A | 1/1998 | Liaw et al. | |
| 5,749,081 A | 5/1998 | Whiteis et al. | |
| 5,752,217 A | 5/1998 | Ishizaki et al. | |
| 5,757,289 A | 5/1998 | Nimura et al. | |
| 5,797,106 A | 8/1998 | Murray et al. | |
| 5,799,284 A | 8/1998 | Bourquin | |
| 5,802,492 A | 9/1998 | DeLorme et al. | |
| 5,835,905 A | 11/1998 | Pirolli et al. | |
| 5,845,300 A | 12/1998 | Comer et al. | |
| 5,848,373 A | 12/1998 | DeLorme et al. | |
| 5,850,193 A | 12/1998 | Shimoura et al. | |
| 5,870,744 A | 2/1999 | Sprague | |
| 5,884,213 A | 3/1999 | Carlson | |
| 5,895,454 A | 4/1999 | Harrington | |
| 5,896,321 A | 4/1999 | Miller et al. | |
| 5,910,177 A | 6/1999 | Zuber | |
| 5,911,773 A | 6/1999 | Mutsuga et al. | |
| 5,913,032 A | 6/1999 | Schwartz et al. | |
| 5,938,720 A | 8/1999 | Tamai | |
| 5,948,040 A | 9/1999 | DeLorme et al. | |
| 5,960,429 A | 9/1999 | Peercy et al. | |
| 5,974,419 A | 10/1999 | Ashby | |
| 5,991,689 A | 11/1999 | Aito et al. | |
| 5,999,932 A | 12/1999 | Paul | |
| 6,016,485 A | 1/2000 | Amakawa et al. | |
| 6,023,655 A | 2/2000 | Nomura | |
| 6,038,559 A | 3/2000 | Ashby et al. | |
| 6,041,311 A | 3/2000 | Chislenko et al. | |
| 6,049,753 A | 4/2000 | Nimura | |
| 6,072,409 A | 6/2000 | Fushimi et al. | |
| 6,092,049 A | 7/2000 | Chislenko et al. | |
| 6,098,016 A | 8/2000 | Ishihara | |
| 6,121,900 A | 9/2000 | Takishita | |
| 6,122,593 A | 9/2000 | Friederich et al. | |
| 6,124,810 A | 9/2000 | Segal et al. | |
| 6,128,574 A | 10/2000 | Diekhans | |
| 6,144,318 A | 11/2000 | Hayashi et al. | |
| 6,157,618 A | 12/2000 | Boss et al. | |
| 6,189,026 B1 | 2/2001 | Birrell et al. | |
| 6,192,314 B1 | 2/2001 | Khavakh et al. | |
| 6,195,611 B1 | 2/2001 | Sakamoto et al. | |
| 6,202,026 B1 | 3/2001 | Nimura et al. | |
| 6,208,996 B1 | 3/2001 | Ben-Shachar et al. | |
| 6,223,059 B1 | 4/2001 | Haestrup | |
| 6,237,092 B1 | 5/2001 | Hayes, Jr. | |
| 6,246,957 B1 | 6/2001 | Barrer et al. | |
| 6,247,043 B1 | 6/2001 | Bates et al. | |
| 6,249,742 B1 | 6/2001 | Friederich et al. | |
| 6,259,988 B1 | 7/2001 | Galkowski et al. | |
| 6,260,148 B1 | 7/2001 | Aggarwal et al. | |
| 6,263,277 B1 | 7/2001 | Tanimoto et al. | |
| 6,269,369 B1 | 7/2001 | Robertson | |
| 6,278,935 B1 | 8/2001 | Kaplan et al. | |
| 6,278,939 B1 | 8/2001 | Robare et al. | |
| 6,278,942 B1 | 8/2001 | McDonough | |
| 6,282,489 B1 | 8/2001 | Bellesfield et al. | |
| 6,285,950 B1 | 9/2001 | Tanimoto | |
| 6,289,277 B1 | 9/2001 | Feyereisen et al. | |
| 6,292,743 B1 | 9/2001 | Pu et al. | |
| 6,292,745 B1 | 9/2001 | Robare et al. | |
| 6,301,609 B1 | 10/2001 | Aravamudan et al. | |
| 6,317,685 B1 | 11/2001 | Kozak et al. | |
| 6,321,158 B1 | 11/2001 | DeLorme et al. | |
| 6,324,470 B1 | 11/2001 | White | |
| 6,327,590 B1 | 12/2001 | Chidlovskii et al. | |
| 6,338,021 B1 | 1/2002 | Yagyu et al. | |
| 6,349,261 B1 | 2/2002 | Ohnishi et al. | |
| 6,349,299 B1 | 2/2002 | Spencer et al. | |
| 6,351,707 B1 | 2/2002 | Ichikawa | |
| 6,356,911 B1 | 3/2002 | Shibuya | |
| 6,360,251 B1 | 3/2002 | Fujita et al. | |
| 6,392,669 B1 | 5/2002 | Matoba et al. | |
| 6,397,145 B1 | 5/2002 | Millington | |
| 6,401,027 B1 | 6/2002 | Xu et al. | |
| 6,421,606 B1 | 7/2002 | Asai et al. | |
| 6,424,355 B2 | 7/2002 | Watanabe et al. | |
| 6,424,910 B1 | 7/2002 | Ohler et al. | |
| 6,424,912 B1 | 7/2002 | Correia et al. | |
| 6,427,119 B1 | 7/2002 | Stefan et al. | |
| 6,430,501 B1 | 8/2002 | Slominski | |
| 6,430,604 B1 | 8/2002 | Ogle et al. | |
| 6,434,484 B1 | 8/2002 | Lee | |
| 6,438,561 B1 | 8/2002 | Israni et al. | |
| 6,446,110 B1 | 9/2002 | Lection et al. | |
| 6,456,933 B1 | 9/2002 | Hessing | |
| 6,457,044 B1 | 9/2002 | IwaZaki | |
| 6,463,384 B1 | 10/2002 | Kaplan et al. | |
| 6,463,471 B1 | 10/2002 | Dreke et al. | |
| 6,466,918 B1 | 10/2002 | Spiegel et al. | |
| 6,526,335 B1 | 2/2003 | Treyz et al. | |
| 6,529,821 B2 | 3/2003 | Tomasi et al. | |
| 6,529,903 B2 | 3/2003 | Smith et al. | |
| 6,549,933 B1 | 4/2003 | Barrett et al. | |
| 6,549,937 B1 | 4/2003 | Auerbach et al. | |
| 6,564,213 B1 | 5/2003 | Ortega et al. | |
| 6,564,264 B1 | 5/2003 | Creswell et al. | |
| 6,567,796 B1 | 5/2003 | Yost et al. | |
| 6,574,553 B1 | 6/2003 | Beesley et al. | |
| 6,577,937 B1 | 6/2003 | Shuman et al. | |
| 6,591,188 B1 | 7/2003 | Ohler | |
| 6,601,073 B1 | 7/2003 | Robare | |
| 6,606,657 B1 | 8/2003 | Zilberstein et al. | |
| 6,615,237 B1 | 9/2003 | Kyne et al. | |
| 6,643,669 B1 | 11/2003 | Novak et al. | |
| 6,647,336 B1 | 11/2003 | Iwata | |
| 6,671,615 B1 | 12/2003 | Becker et al. | |
| 6,677,968 B1 | 1/2004 | Appelman | |
| 6,687,362 B1 | 2/2004 | Lindquist et al. | |
| 6,694,353 B2 | 2/2004 | Sommerer | |
| 6,701,348 B2 | 3/2004 | Sommerer | |
| 6,708,110 B2 | 3/2004 | Stefan et al. | |
| 6,714,791 B2 | 3/2004 | Friedman | |
| 6,725,156 B2 | 4/2004 | Kaplan | |
| 6,728,630 B1 | 4/2004 | Burt et al. | |
| 6,738,766 B2 | 5/2004 | Peng | |
| 6,750,881 B1 | 6/2004 | Appelman | |
| 6,751,603 B1 | 6/2004 | Bauer et al. | |
| 6,785,608 B1 | 8/2004 | Milici et al. | |
| 6,829,607 B1 | 12/2004 | Tafoya et al. | |
| 6,853,982 B2 | 2/2005 | Smith et al. | |
| 6,912,505 B2 | 6/2005 | Linden et al. | |
| 6,912,564 B1 | 6/2005 | Appelman et al. | |
| 6,922,633 B2 | 7/2005 | Takenaka | |
| 6,996,469 B2 | 2/2006 | Lau et al. | |
| 7,007,008 B2 | 2/2006 | Goel et al. | |
| 7,031,961 B2 | 4/2006 | Pitkow et al. | |
| 7,035,865 B2 | 4/2006 | Doss et al. | |
| 7,058,690 B2 | 6/2006 | Maehiro | |
| 7,079,945 B1 | 7/2006 | Kaplan | |
| 7,082,443 B1 | 7/2006 | Ashby | |
| 7,089,237 B2 | 8/2006 | Turnbull et al. | |
| 7,089,264 B1 | 8/2006 | Guido et al. | |
| 7,095,964 B2 | 8/2006 | Koyama et al. | |
| 7,096,214 B1 | 8/2006 | Bharat et al. | |
| 7,133,771 B1 | 11/2006 | Nesbitt | |
| 7,146,416 B1 | 12/2006 | Yoo et al. | |
| 7,321,824 B1 | 1/2008 | Nesbitt | |
| 7,356,405 B1 | 4/2008 | Nesbit | |
| 7,392,326 B2 * | 6/2008 | Vale | 709/245 |
| 7,779,011 B2 * | 8/2010 | Venkataraman et al. | 707/742 |
| 2001/0002469 A1 | 5/2001 | Bates et al. | |
| 2001/0020213 A1 | 9/2001 | Hatano | |
| 2001/0021895 A1 | 9/2001 | Yamazaki | |
| 2001/0047241 A1 | 11/2001 | Khavakh et al. | |
| 2001/0056325 A1 | 12/2001 | Pu et al. | |
| 2002/0011941 A1 | 1/2002 | Endo et al. | |
| 2002/0025031 A1 * | 2/2002 | Maeda et al. | 379/355.04 |
| 2002/0049610 A1 | 4/2002 | Gropper | |
| 2002/0049704 A1 | 4/2002 | Vanderveldt et al. | |
| 2002/0049751 A1 | 4/2002 | Chen et al. | |
| 2002/0052921 A1 | 5/2002 | Morkel | |

| | | | |
|---|---|---|---|
| 2002/0077745 A1 | 6/2002 | Ohmura et al. | |
| 2002/0087262 A1 | 7/2002 | Bullock et al. | |
| 2002/0097856 A1 | 7/2002 | Wullert, II | |
| 2002/0116528 A1 | 8/2002 | Vale | |
| 2002/0123328 A1 | 9/2002 | Snip et al. | |
| 2002/0160817 A1* | 10/2002 | Salmimaa et al. | 455/566 |
| 2002/0169748 A1 | 11/2002 | Macholda | |
| 2002/0183922 A1 | 12/2002 | Tomasi et al. | |
| 2002/0184128 A1 | 12/2002 | Holtsinger | |
| 2003/0009385 A1 | 1/2003 | Tucciarone et al. | |
| 2003/0036848 A1 | 2/2003 | Sheha et al. | |
| 2003/0046000 A1 | 3/2003 | Morita et al. | |
| 2003/0054830 A1* | 3/2003 | Williams et al. | 455/456 |
| 2003/0058478 A1 | 3/2003 | Aoki | |
| 2003/0060973 A1 | 3/2003 | Mathews et al. | |
| 2003/0065805 A1 | 4/2003 | Barnes, Jr. | |
| 2003/0093219 A1 | 5/2003 | Schultz et al. | |
| 2003/0105682 A1 | 6/2003 | Dicker et al. | |
| 2003/0119561 A1* | 6/2003 | Hatch et al. | 455/566 |
| 2003/0120423 A1 | 6/2003 | Cochlovius et al. | |
| 2003/0158860 A1 | 8/2003 | Caughey | |
| 2003/0182052 A1 | 9/2003 | DeLorme et al. | |
| 2003/0220946 A1 | 11/2003 | Malik | |
| 2003/0220976 A1 | 11/2003 | Malik | |
| 2004/0012505 A1 | 1/2004 | Yokota | |
| 2004/0029572 A1 | 2/2004 | Nerot | |
| 2004/0042405 A1 | 3/2004 | Nesbitt | |
| 2004/0044465 A1 | 3/2004 | Nesbitt | |
| 2004/0044466 A1 | 3/2004 | Nesbitt | |
| 2004/0044536 A1 | 3/2004 | Fitzpatrick et al. | |
| 2004/0044736 A1 | 3/2004 | Austin-Lane et al. | |
| 2004/0052239 A1 | 3/2004 | Nesbitt | |
| 2004/0054646 A1 | 3/2004 | Daniell et al. | |
| 2004/0054736 A1 | 3/2004 | Daniell et al. | |
| 2004/0059708 A1 | 3/2004 | Dean et al. | |
| 2004/0121817 A1* | 6/2004 | Tng et al. | 455/566 |
| 2004/0143564 A1 | 7/2004 | Gross et al. | |
| 2004/0148347 A1 | 7/2004 | Appelman et al. | |
| 2004/0176907 A1 | 9/2004 | Nesbitt | |
| 2004/0204140 A1* | 10/2004 | Nagata | 455/566 |
| 2004/0215793 A1 | 10/2004 | Ryan et al. | |
| 2004/0267604 A1 | 12/2004 | Gross et al. | |
| 2005/0071251 A1 | 3/2005 | Linden et al. | |
| 2005/0102202 A1 | 5/2005 | Linden et al. | |
| 2005/0246324 A1* | 11/2005 | Paalasmaa et al. | 707/3 |
| 2005/0283468 A1* | 12/2005 | Kamvar et al. | 707/3 |
| 2006/0259476 A1 | 11/2006 | Kadayam et al. | |
| 2007/0288648 A1* | 12/2007 | Mehanna et al. | 709/231 |
| 2008/0114535 A1 | 5/2008 | Nesbitt | |
| 2008/0147313 A1 | 6/2008 | Nesbitt | |

FOREIGN PATENT DOCUMENTS

| | | |
|---|---|---|
| WO | WO 99/17080 | 4/1999 |
| WO | WO 00/22593 | 4/2000 |
| WO | WO 01/80079 | 10/2001 |
| WO | WO 02093400 | 11/2002 |
| WO | WO 02093875 | 11/2002 |
| WO | WO 2006/060340 | 6/2006 |

OTHER PUBLICATIONS

Bergholm et al., "Analysis of Current Approaches in Vision-Based Navigation," from http://72.14.203.104/search?, printed on Apr. 28, 2006.

Bertino et al., "Navigational accesses in a temporal object model," Knowledge and Data Engineering, IEEE Transactions on, vol. 10, Issue 4, Jul.-Aug. 1998, pp. 656-665, Digital Object Identifier 10.1109/69.706062.

Bryan Pfaffenberger, Netscape Navigator Gold, AP Professional, 1997, 4 pages.

Cerulean Studios, "Trillian Pro: No Boundaries,", (Overview, New Features, Tech Specs, Corporate, Product Tour—16 total pages).

Cerulean Studios, "Trillian: Your Freedom to Chat," (Overview, Features, Screenshots, Tech Specs—8 total pages).

Chen et al., "Reliable pre-trip multi-path planning and dynamic adaptation for a centralized road navigation system," Intelligent Transportation Systems, 2005 Proceedings, 2005 IEEE, Sep. 13-15, 2005, pp. 257-262, Digital Object Identifier 10.1109/ITSC.2005.1520057.

Danny Sullivan, "What People Search for," Search Engine Watch, http://searchenginewatch.com/facts/searches.html, 4 pages.

Deiss, "Garmin GPS Feature Comparisons and Upgrade Information," Apr. 7, 2006.

Edelkamp et al., "Geometric travel planning," Intelligent Transportation Systems, IEEE Transactions on vol. 6, Issue 1, Mar. 2005, pp. 5-16, Digital Object Identifier 10.1109/TITS.2004.838182.

European Office Action, Application Serial No. 03 811 631.5-2201, dated Oct. 4, 2006, 4 pages.

Fleischman, "Research and Evaluation Plans for the TravTek IVHS Operational Field Test," General Motors Research Labs, Operating Sciences Dept , unknown date, pp. 827-837.

From Internet, Unknown author, PowerPoint Maps You EditUSA, States, World and more. All maps ready to use, Buy 24/7.www. PresentationMaps.com, unknown date.

From Internet, Unknown author, Presentation Style Impact, Present yourself with charisma and impact. Small group workshops! MarieMoran.com/PresentationStyle, unknown date.

Guzolek et al., "Real-time Route Planning in Road Networks," Vehicle Navigation and Information Systems Conference, 1989. Conference Record Toronto, Ontario, Canada, Sep. 11-13, 1989, New York, NY, USA, IEEE, US, Sep. 11, 1989, pp. 165-169, XP010034444, ISBN: 0-9692316-2-8.

Haigron et al.,"Depth-map-based scene analysis for active navigation in virtual angioscopy," Medical Imaging, IEEE Transactions on, vol. 23, Issue 11, Nov. 2004, pp. 1380-1390, Digital Object Identifier 10.1109/TMI.2004.836869.

Jennifer 8. Lee, "From 100 countries, a Google snapshot of what's going on," International Herald Tribune, Nov. 29, 2002, http://www,iht.com, 3 pages.

Lankenau et al., "A versatile and safe mobility assistant," Robotics & Automation Magazine, IEEE, vol. 8, Issue 1, Mar. 2001, pp. 29-37, Digital Object Identifier 10.1109/100.924355.

Meng et al., "A novel ad hoc routing protocol research based on mobility prediction algorithm," in Wireless Communications, Networking and Mobile Computing, 2005, Proceedings, 2005 International Conference on vol. 2, Sep. 23-26, 2005, pp. 791-794, Digital Object Identifier 10.1109/WCNM.2005.1544171.

Mozilla, www.mozilia.org/projects/ml/autocomplete, Mar. 13, 2003, 6 pages.

Nelson et al., "Vehicle-Based Route Planning in Advanced Traveler Information Systems," Intelligent Vehicles '93 Symposium, Tokyo, Japan, Jul. 14-16, 1993, New York, NY, USA, IEEE, US, Jul. 14, 1993, pp. 152-156, XP010117308, ISBN: 0-7803-1370-4.

Office Action issued in U.S. Appl. No. 10/651,303, mailed Feb. 9, 2007, 42 pages.

Office Action issued in U.S. Appl. No. 10/651,303, mailed Apr. 28, 2008, 20 pages.

PCT International Search Report, PCT/US03/36656, dated Apr. 22, 2004, 6 pages.

PCT International Search Report and Written Opinion issued in International Application No. PCT/US05/24519 mailed Jun. 26, 2008, 8 pages.

Unknown author, Impressive Presentations, Quickly Create & Distribute—Impressive Presentations—FreeTrial, www.presentationengine.com, unknown date.

Unknown author, Maps You Can Edit, For Powerpoint Presentations, World, USA, States, Counties, Globe, www,MapsForDesign.com, unknown date.

Valavanis et al, "A case study of fuzzy-logic-based robot navigation," Robotics & Automation Magazine, IEEE, vol. 13, Issue 3, Sep. 2006, pp. 93-107, Digital Object Identifier 10.1109/MRA.2006.1678143.

Yahoo! Buzz Index, Nov. 10, 2002, 1 page.

Yahoo! Messenger, "Messenger Help," (4 total pages).

Yang et al., "Path planning and evaluation in IVHS databases," Vehicle Navigation and Information Systems Conference, 1991, vol. 2, Oct. 20-23, 1991, pp. 283-290.

Yum et al., "QoS provisioning in clusters: an investigation of router and NIC design," in Computer Architecture, 2001, Proceedings, 28$^{th}$ Annual International Symposium on Jun. 30-Jul. 4, 2001, pp. 120-129, Digital Object Identifier 10.1109/ISCA.2001.937441.

* cited by examiner

Fig. 8

DISAMBIGUATING AMBIGUOUS CHARACTERS

CROSS-REFERENCE TO RELATED APPLICATIONS

This application claims priority to U.S. Provisional Application No. 60/586,502, titled "On Demand Download" and filed Jul. 9, 2004.

TECHNICAL FIELD

This document relates to content retrieval and presentation.

BACKGROUND

The Internet enables users to access a great amount of information. A user with a web browser, a messaging application, or another proprietary application may retrieve information from large libraries to access great amounts of information. Navigating the great amount of information can, however, challenge some users.

SUMMARY

In one general sense, information may be presented to a user by receiving one or more ambiguous characters that may be resolved to one of at least two disambiguated characters, exchanging at least one of the ambiguous characters with a host, receiving, from the host, results from that reflect disambiguated terms related to the ambiguous characters exchanged with the host, rendering the results in a manner enabling the user to perceive which of the disambiguated terms will be used upon user selection of an aspect of the results, and enabling the user to select an aspect of the results to effect use of a corresponding one of the disambiguated terms.

Implementations may include one or more of the following features. For example, a wireless phone with a reduced-entry keypad may be used to enter the one or more ambiguous characters. At least some of the ambiguous characters may be transmitted to the host across a wireless network and the results may be rendered in a display on the wireless phone. The user may be enabled to manipulate the reduced-entry keypad of the wireless phone to select an aspect of the results that effects one of the disambiguated terms for use as a selected disambiguated term.

The user may be enabled to enter a special character. The special character may be used to select a subset from within the results and the subset may be rendered. Enabling the user to enter the special character may include enabling the user to select a "#" key, a "*" key, or an arrow button as a mechanism to effect selection of the subset.

One or more ambiguous characters may be analyzed before exchanging the sequence with the host. The results may be rendered in response to analyzing the sequence and the user may be enabled to interact with the results. As a result of user interaction with the results, at least some of the ambiguous characters may be exchanged with the host to update the results.

It may be determined if a threshold number of ambiguous characters has been received, and the ambiguous characters may be exchanged upon receipt of the threshold number of ambiguous characters. It may be determined if an updated threshold of updated ambiguous characters have been received, and the updated ambiguous characters may be exchanged upon receipt of the updated threshold of ambiguous characters. Updated results may be received from the host and rendered.

Establishing communications with the host may include activating an inactive communications channel or accessing an active communications channel. Communications with the host may be established upon receipt of the threshold number of ambiguous characters and the ambiguous characters may be exchanged when communications have been established.

Communications with the host may be established upon receipt of the threshold number of ambiguous characters and nonambiguous characters and the ambiguous characters and the nonambiguous characters may be exchanged when communications have been established.

Nonambiguous characters may be received and exchanged with the host. Receiving the ambiguous characters may include receiving only ambiguous characters. Receiving the ambiguous characters may include receiving handwritten input resulting from a handwriting recognition system.

Receiving the ambiguous characters may include receiving an indication of a handwritten stroke in an ideographic language.

In another general sense, information may be presented to a user by receiving one or more ambiguous characters that may be resolved to one of at least two disambiguated characters, analyzing the ambiguous characters, based on analysis of the ambiguous characters, generating results that identify several user applications that are related to the ambiguous characters, rendering the results in a manner enabling the user to perceive which one of the several user applications will be launched in response to user selection of a corresponding aspect of the results, and enabling the user to select one aspect of the results to effect a launch of the user application corresponding to the selected aspect of the results.

Implementations may include one or more of the following features. For example, a wireless phone with a reduced-entry keypad may be used to enter the one or more ambiguous characters. The ambiguous characters may be related to disambiguated terms and the several user applications may be identified based on the disambiguated terms. The results may be rendered in a display on the wireless phone with an indication of an application that will be launched upon user selection of the aspect of the results corresponding to the user application and the user may be enabled to use a reduced-entry keypad of the wireless phone to select one aspect of the results corresponding to one of the several user applications.

Based upon the one or more received ambiguous characters, a first corresponding disambiguated result may be identified that is attainable through invocation of a browser application and a second corresponding disambiguated result may be identified that is attainable through invocation of a directory service application. The first corresponding disambiguated result and the second corresponding disambiguated result may be rendered and selection by the user of the first corresponding result or the second corresponding result may be enabled.

Identifying the first corresponding disambiguated result that is attainable through invocation of the browser application may include identifying the first corresponding disambiguated result that is attainable through invocation of a browser application that is configured to render content using a markup language other than a Hyper Text Markup Language (HTML). Identifying the first corresponding disambiguated result that is attainable through invocation of the browser application may include enabling the user to access different applications through the browser application. Enabling the user to access the different applications through the browsing application may include enabling the user to access at least one of a mapping service, a web browsing service, an advertising service, an instant messaging service, and an email service.

Rendering the results in a display on the wireless phone with the indication of the application may include rendering the results with an icon representative of the application. The ambiguous characters may be related to disambiguated terms and the several user applications may be identified based on the disambiguated terms.

DESCRIPTION OF DRAWINGS

FIGS. 5-10 are exemplary graphical user interfaces (GUIs) illustrating how real-time results related to a character stream may be presented.

FIG. 16 also illustrates the use of icons to provide an indicate of an application invoked in response to selecting a particular result.

DETAILED DESCRIPTION

Figure 1:
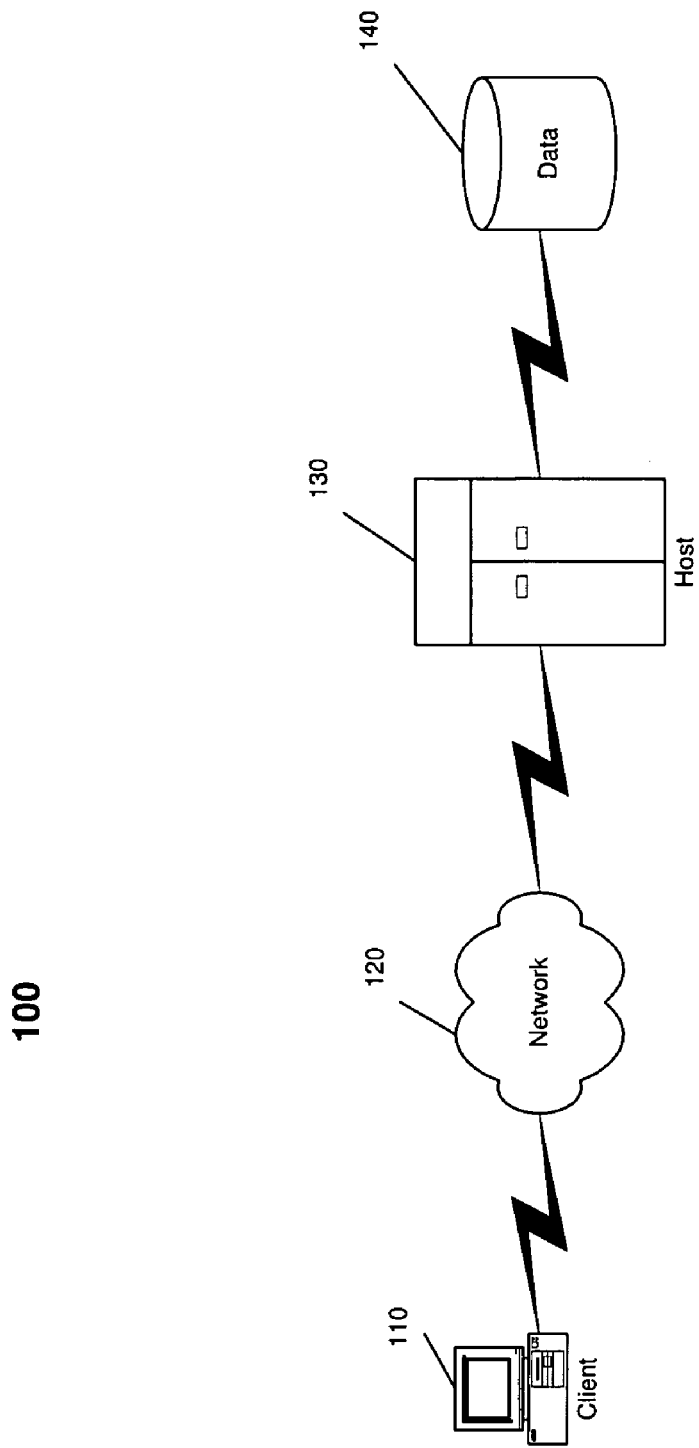
FIG. 1 illustrates a communications system that may be used to intelligently present results related to a character stream analyzed by a host.

A key challenge in providing an improved experience for users accessing the Internet and its large content reserves is enabling the users to access information most relevant to their interests with the least amount of effort in retrieving the results. This challenge is pronounced when users operate devices that have ambiguous character sets, such as wireless phones that have reduced-entry keypads. For example, a user relying on a wireless phone with a reduced-entry keypad (e.g., a 12 character touchpad where a "2" button also represents "A", "B", and "C") may find it difficult to access an application predicated upon entry of one or more characters.

To assist users who enter ambiguous input, it is possible to resolve the ambiguous input into several potential disambiguated candidates and to enable user selection among those candidates. Furthermore, in addition to providing the user with an indication of the disambiguated candidates, applications and/or related actions may be provided in addition or as an alternative to presenting the disambiguated candidates.

More specifically, for instance, a user may enter a sequence of one or more ambiguous characters on a device such as a wireless phone. The ambiguous characters may be analyzed and results may be generated in response. The results may be related to several disambiguated terms and also related to more than one user applications. For example, user entry of "733" on a 12 key alphanumeric keypad on wireless phone may be analyzed and resolved to terms relating to or including "RED". The term "RED" may in turn be related to different applications, such as a mapping application related to Redondo Beach, a sports application related to the Washington Redskins, and/or a directory service application related to Red Lobster. The results are rendered in a manner enabling the user to perceive which one of the several user applications is available for user selection/launch. For example, a wireless phone may indicate that selection of a first result launches a mapping application and selection of a second result launches a directory service application. Finally, the user is made able to select one of the disambiguated terms to launch one of the user applications related to the selected result. For example, a user on a wireless phone may use arrow keys and a selection button to launch a mapping application that provides driving direction in Redondo Beach.

In another example, a user on a wireless phone may enter "23212" as a sequence of ambiguous characters. The wireless phone may provide the results to a host for analysis. The host may retrieve maps and directory service information related to "23212". Note that in this example, the user did not identify a mapping label, dialing information, or include the words "zip code" to retrieve the results for zip code 23212. Rather, the sequence of ambiguous characters is analyzed and used to determine that an input of its content or form may correspond to this form or type of input and thus may be used to inspire consideration or display of potential mapping results may be considered and/or displayed.

Even though the sequence of ambiguous characters may relate to a variety of applications and/or be resolved to multiple disambiguated terms, the results may be displayed in such a manner that the user may select one of the results to launch an application or a code segment related to the selected item. For example, if the displayed results include a list of plumbers available to support the user, selecting one of the entries may launch a web page operated by a particular plumber. In another example, a phone call, an electronic mail message or an instant message may be transmitted to the plumber whose entry was selected from the results. In yet another example, the user may insert a result as an object (e.g., an attachment, link or word) in a message.

The user may continue to enter one or more ambiguous characters, and the results may be modified based on recently received ambiguous characters. For example, in one implementation, when a character stream is analyzed initially after entering "spring", results related to the season of spring and products using the term "spring" may be returned. When the user types a "f" character (or the "3DEF" key), the additional input may be transmitted to the host, which in turn generates results related to "springf". In one example, the previous results related to "spring" are filtered to generate a new list that only includes content related to "springf". In another example, a new query is run identifying terms related to "springf".

Regardless of how the query is structured, a host identifies results related to "springf", which may include one or more selections related to cities and towns named Springfield. Results for multiple towns may be presented in a portion of the application that the user is accessing. In one example, the user may be allowed to select one of the results to generate a map related to the selected Springfield. In another example, the user may be presented with entries for "Springfield, Mass." and "Springfield, Ill." The user may continue typing characters in the character stream. When the user types in an "I" character after "Springfield" has been identified, the "Springfield, Mass." entry may be removed. The user then may select the "Springfield, Ill." entry to retrieve a map of Springfield, Ill.

FIG. 1 shows a communications system 100 that enables intelligent presentation of results related to a character stream. Generally, a client 110 exchanges communications relating to a character stream of noncompletion character with a host 130 using network 120. The host 130 analyzes the character stream to generate results related to the character stream using, for example, a database 140 (e.g., a yellow pages directory or a mapping system). The host 130 provides one or more results to the client 110, which in turn displays the results.

Generally, the client 110 includes a computing device that enables a user to exchange information over a communications network. The client 110 may include one or more devices capable of accessing content on the host 130. The client 110 also may include a controller (not shown) that processes instructions received from or generated by a software application, a program, a piece of code, a device, a computer, a computer system, or a combination thereof, which independently or collectively direct operations of the client 110. The instructions may be embodied permanently or temporarily in any type of machine, component, equipment, storage medium, or propagated signal that is capable of being delivered to the client 110 or that may reside with the controller at client 110. Client 110 may include a general-purpose computer (e.g., a personal computer (PC)) capable of responding to and executing instructions in a defined manner, a workstation, a notebook computer, a PDA ("Personal Digital Assistant"), a wireless phone, a component, other equipment, or some combination of these items that is capable of responding to and executing instructions.

In one implementation, the client 110 includes one or more information retrieval software applications (e.g., a browser, a mail application, an instant messaging client, an Internet service provider client, or an AOL TV or other integrated client) capable of receiving one or more data units. The information retrieval applications may run on a general-purpose operating system and a hardware platform that includes a general-purpose processor and specialized hardware for graphics, communications and/or other capabilities. In another implementation, client 110 may include a wireless telephone running a micro-browser application on a reduced operating system with general purpose and specialized hardware capable of operating in mobile environments.

The client 110 includes one or more character stream code segments that analyze a character stream input to an information retrieval application. The character stream code segment receives the stream and structures the exchange of the character stream with other software applications on the client 110 and/or host 130. For example, the character stream code segment may wait initially wait until X initial characters are received before sending a transmission to the host 130. The character stream code segment then may send updates to the host every Y subsequent characters. Alternatively, the character stream code segment may include a delay feature set that transmits an update to the character stream if there are Z seconds of user inactivity. Thus, when X is 5 ("five") characters, Y is 2 ("two") characters, and Z is 1 ("one") second, the character stream code segment for a user who types in "DULLES GAS STAT." would request results 1) after "DULLE" 2) after "DULLES", "DULLES GA","DULLES GAS", "DULLES GAS ST", and "DULLES GAS STAT". In the same example, if the user typed "DULLES GAS S" and paused for more than a second (when Z=1 second and the delay feature set is being used), the character stream code segment would send the "DULLES GAS S" string to the host for analysis.

Alternatively or in addition, a client may wait until a different condition has been met before exchanging characters with a host. For example, a client may monitor user activities to determine if the user has walked through a list of matching terms more than a threshold number of times, or to determine if the user manually selected a "MORE" button. In yet another example, a client may exchange a selected word to retrieve additional results using the selected word as basis for analysis. Thus, when the user enters "733" on a reduced-entry keypad and then selects "Redskins", the client requests additional results related to "Redskins".

The client 110 may include a preliminary analysis code segment to analyze the character stream and send periodic updates. The preliminary analysis code segment screens the character stream to enhance the efficacy of the results generated for the character stream. In one example, the preliminary analysis code segment identifies one or more databases or segments likely to be associated with the predicted interest of a consumer. Thus, when "20005" is entered, the preliminary analysis code segment may instruct an instruction in the transmission to the host 130 to poll geographic information related to zip code 20005. Other examples may include the preliminary analysis code segment identifying a service industry (e.g., plumbers), a segment (e.g., online music), or a combination of factors (e.g., plumbers in zip code 20005) as relevant to the results that are sought by the user. With the preliminary factors identified, the transmission may be sent to an appropriate database, or a query may be modified as a result of performing the preliminary analysis.

In another example, the preliminary analysis code segment also may correlate information that has been learned about a user with the character stream. If the client is believed to be operating in a particular area (e.g., based on GPS data, wireless tower information, and/or billing information for the user), the character stream can be modified to instruct the host 130 that results should be responsive to the user's relative or absolute location. Similarly, the preliminary analysis code segment may interface with a cache or user history to better identify results for the user. Thus, if a history of user activity indicates that the user is interested in National Football League sporting events, the preliminary analysis code segment may tailor results based on the relationship of the results to American Football rather than International Football (soccer). The preliminary analysis code segment also may retrieve and display locally stored results before the host 130 is accessed.

The client 110 may include a communications code segment that interfaces with the information retrieval code segment (e.g., browser or key word tool) to modify the character stream results to reflect the network environment of the client. For example, when the client 110 includes a wireless phone with limited bandwidth, the communications code segment may structure the communications exchange to limit the amount of data in results that are returned so as not to overwhelm the network 120. This may include filtering the results so that no more than a specified number of results are returned. Similarly, the format of the results may be modified to reduce the bandwidth of results. For example, results transmitted to the client 110 may have the graphics or images removed from the application.

The client may include a display code segment that tailors the results to a display device (e.g., a monitor or a LCD ("Liquid Crystal Display")). The display code segment may manage the presentation of results so that only the most likely results are presented. The display code segment may interface with the host 130 so that the number of results does not overwhelm the memory or display capabilities of the client. In one example, the display code segment may instruct the host 130 to transmit no more than a specified number of results. In another example, the display code segment may instruct the host 130 to not return any result items larger than a specified size.

The client 110 may include one or more media applications. For example, the client 110 may include a software application that enables the client 110 to receive and display an audio or video data stream. The media applications may include controls that enable a user to configure the user's media environment. For example, if the media application is receiving an Internet radio station, the media application may include controls that enable the user to select an Internet radio station, for example, through the use of "preset" icons indicating the station genre (e.g., country) or a favorite.

The network 120 may include hardware and/or software capable of enabling direct or indirect communications between the client 110 and the host 130. As such, the network 120 may include a direct link between the client 110 and the host 130, or it may include one or more networks or subnetworks between them (not shown). Each network or subnetwork may include, for example, a wired or wireless data pathway capable of carrying and receiving data. Examples of networks include the Internet, the World Wide Web, a WAN ("Wide Area Network"), a LAN ("Local Area Network"), analog or digital wired and wireless telephone networks, radio, television, cable, satellite, and/or any other delivery mechanism for carrying data.

The host 130 is generally capable of executing instructions under the command of a host controller (not shown). The host 130 may include one or more hardware components and/or software components. An example of a host 130 is a general-purpose computer (e.g., a server or a mainframe computer) capable of responding to and executing instructions in a defined manner. Other examples include a special-purpose computer, a workstation, a PC, a device, a component, other physical or virtual equipment, or some combination thereof capable of responding to and executing instructions.

The controller is a software application loaded on the host 130 for commanding and directing communications exchanged with the client 110. Other examples include a program, a piece of code, an instruction, a device, a computer, a computer system, or a combination thereof, for independently or collectively instructing the client 110 or the host 130 to interact and operate as described. The host 130 may be embodied permanently or temporarily in any type of machine, component, physical or virtual equipment, storage medium, or propagated signal capable of providing instructions to the client 110 or the host 130.

The controller may include one or more information providing applications to support information retrieval requests sent from the client 110. The information providing applications may include a results code segment that receives a character stream from the client 110 and generates results responsive to a predicted interest by an individual user. Thus, the results code segment may generate one or more results based on the exchange of a character stream received from a client 110.

The results code segment also may receive character stream modifiers received from the preliminary analysis code segment, the communications code segment, the display code segment, and/or other code segments that modify a character stream transmission from the client. The results code segment may process the character stream in accordance with these modifiers. The host 130 also may operate code segments that perform operations similar to the feature sets in the preliminary analysis code segment, the communications code segment, and the display code segment. These host-oriented versions of these code segments may interface with the results code segment to modify the analysis performed and/or the results that are returned. For example, the host 130 may initially access a cache of content previously requested by the user. The previously-returned results may be analyzed for relevancy before additional analysis is performed or additional systems are polled.

The host 130 may interface with a database 140 to analyze the character stream. Generally, the database 140 includes storage for a volume of data and a processing engine that enables the data to be sorted, searched, and analyzed. The database may be organized along functional criteria. For example, a mapping database may be organized by geographical region, while a yellow pages database may be organized by business as well as geographic criteria. In one example, the database may be structured to perform a more detailed analysis on a character stream provided by a host 130. For example, a host 130 may receive a character stream from a client and redirect queries to one or more databases 140. Each of the redirected queries may be modified to further refine the redirected query. For example, a query redirected to a yellow pages directory may have the zip code added as a selection term. Similarly, a query directed to a database that provides stock quotes may include a reference describing which stocks are of interest to the user (e.g., stocks owned by the user).

Figure 2:
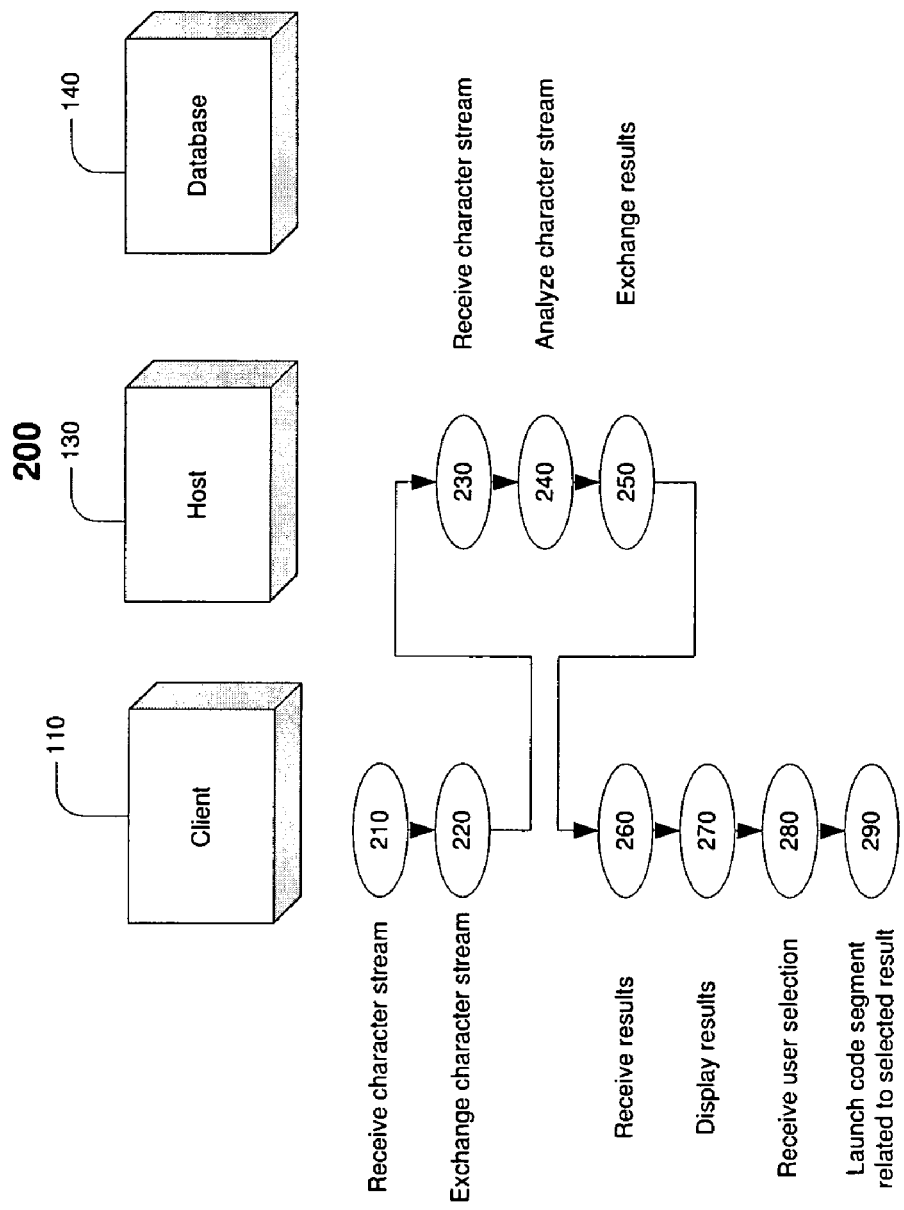
FIG. 2 is a flow chart showing how a client may use a host to intelligently present results related to a character stream.

Referring to FIG. 2, a flow chart 200 illustrates how a client 110 may use a host to intelligently present results related to a character stream of noncompletion characters. Generally, the systems in flow chart 200 relate to the systems described in FIG. 1. Flow chart 200 illustrates how the client 110 receives a character stream (step 210) and exchanges the character stream with the host (step 220). The host 130 receives the character stream (step 230), analyzes the character stream (step 240), and exchanges the results with the client 110 (step 250). The client 110 receives the results (step 260), displays the results (step 270), receives a user selection (step 280), and launches a code segment related to the selected result (step 290).

Initially, the client 110 receives a character stream of one or more noncompletion characters (step 210). Generally, receiving a character stream of one or more noncompletion characters includes receiving and organizing a user's keystrokes that are entered into a user application. For example, a user may be typing an entry into an address form for a web browser, or a key word entry field in a key word utility. Receiving the character stream may include structuring the character stream into transmissions to be exchanged with a host 130. For example, the client application may organize the transmission into a first message after a predetermined number of characters has been entered. The client application may structure additional messages to be created after a predetermined number of additional characters has been entered or a predetermined time period has elapsed between the user-entered characters. The noncompletion label indicates that the user has not indicated that the character entry process has been completed. In other words, a character stream with noncompletion characters indicates that additional characters may be received to modify the search results that are displayed in response to the predicted interest of the user. In contrast, the carriage return or "Enter" key is typically used as a completion character that enables the user to expressly generate results based on the completed character stream. Additionally, the carriage return is a completion character in that additional characters do not cause the results to be modified. On a device with a reduced-entry keypad, such as a mobile phone, a special key (e.g., "down arrow") may be used to signify completion of a term in a sequence of ambiguous characters.

Regardless of how the transmissions between the client 110 and the host 130 are structured, the client 110 sends the character stream with the host (step 220), which receives the character stream (step 230). The host 130 then analyzes the character stream (step 240). Typically, analyzing the character stream includes relating the received character stream to one or more results that are responsive to a predicted interest by the user. In one example, the character stream may be compared with metadata labels used to describe content accessible to the host 130. For example, when the character stream includes "Nashvill", the host 130 may anticipate that "Nashvill" will eventually be completed to "Nashville, Tenn." and identify web pages that feature Nashville, Tenn. in the web page and/or are summarized by Metadata labels with "Nashville, Tenn.". However, the host 130 need not find identical character matches. For example, the host 130 may predict that a user entering "Nashvill" is predictive of an interest in country music. Accordingly, when the host 130 analyzes the results, the host 130 may also identify results related to country music, even if the results are not related to Nashville, Tenn. In another example that illustrates how the character stream may be analyzed using supplemental information, the results may be translated to include country music only when the host determines that the user is not from Tennessee.

Analyzing the character stream may include ranking the relative relevancy of results. For example, widely visited Nashville web sites (e.g., the Nashville Board of Tourism) may be scored as more relevant to a non-Nashville resident than a web site that includes a Nashville resident's personal web log ("blog"). The results may be generated in such a manner that the more relevant results are returned before the less relevant results.

With the character stream analyzed and the results identified, the host 130 exchanges results with the client 110. The results may be controlled so as to comply with the network or display constraints of the client. For example, if the network has limited bandwidth or the client has limited display capabilities, the host 130 may structure the transmission to avoid network congestion or may modify the results so as provide more suitable results (e.g., by removing images from the results that are returned).

The client 110 receives the results (step 260). The client 110 may perform additional processing to review the results to increase the efficacy of the display. For example, the client 110 may relate the returned results to a user profile and tailor the results to be displayed accordingly. In another example, the client may analyze the results to better develop the user profile and interests to increase the efficacy of subsequent character stream operations. Regardless of whether the results undergo intermediary processing, the client 110 displays the results (step 270). The results are presented in a manner that enables the user to select one of the results instead of completing their intended sequence of characters. For example, as a user types in an entry in a key word retrieval application, a drop down window may appear in the key word retrieval application with one or more likely results. As the user continues typing, the results appearing in the drop down window may be tailored to reflect the latest analysis of the character stream. When the user sees a result of interest, the user may select the result (step 280). Selection of a result causes the application to launch a code segment related to the selected result (step 290). For example, when the user selects a result describing a map of an area, a web browser accessing a mapping web site may be launched to display a map related to the inputted character stream.

Figure 3:
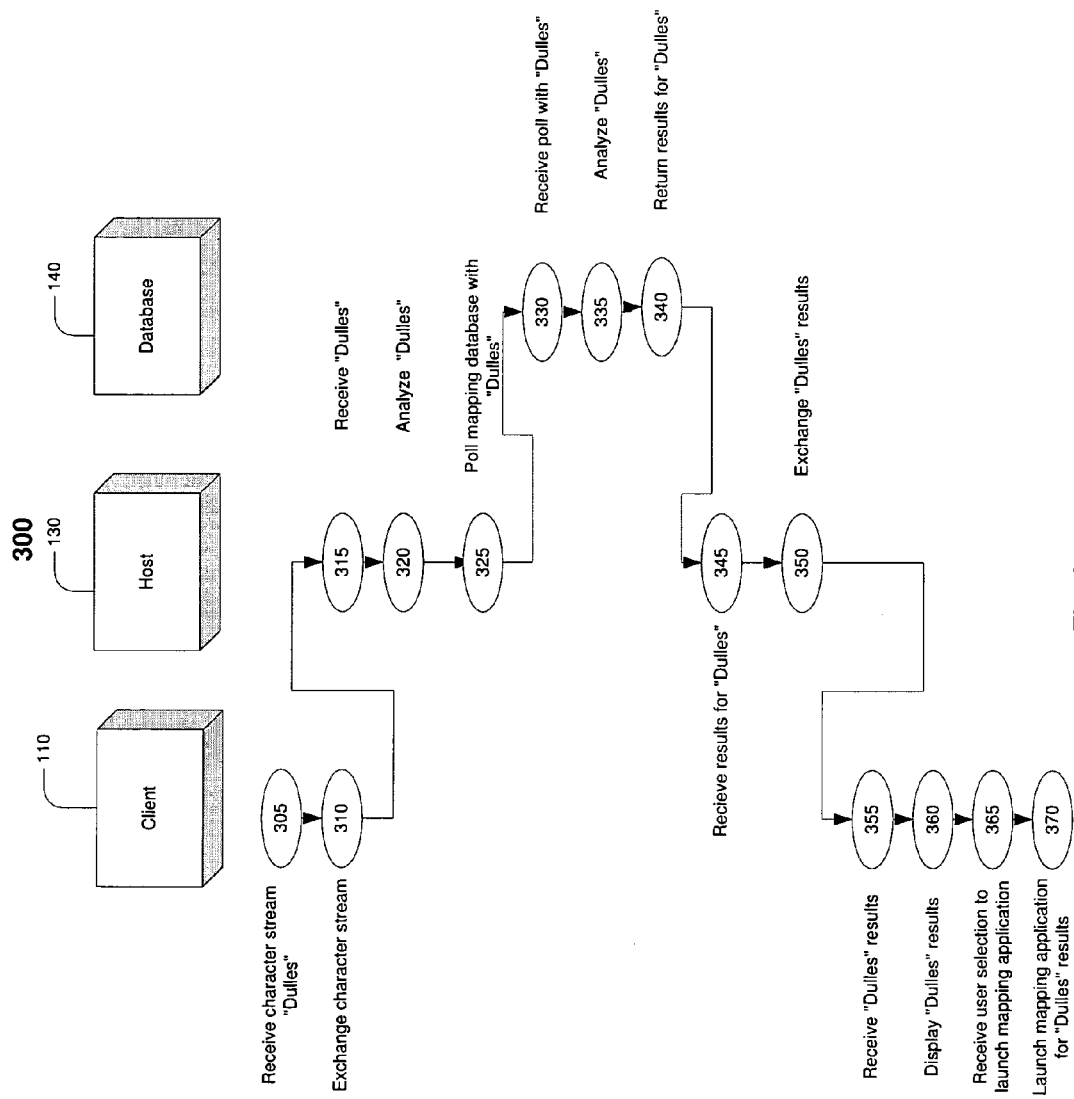
FIG. 3 is a flow chart showing how a client exchanges a character stream with a host and receives mapping information related to the character stream.

FIG. 3 shows a flow chart 300 illustrating how a client 110 exchanges a character stream with a host 130 to retrieve mapping information residing on a database 140. Generally, the systems and operations described in FIG. 3 relate to the systems and operations described previously with respect to FIGS. 1 and 2. However, FIG. 3 illustrates how the host 130 may interface with the database 140 to retrieve results for the client 110. The client 110 exchanges the character stream with the host 130. The host, in turn, uses the database 140 in its analysis of the character stream to produce results. The host provides the results to the client 110, which, in turn, presents the results and launches the appropriate code segment when the user selects the result of interest.

Initially, the user of client 110 enters the character stream "Dulles" (step 305). The client exchanges the character stream with the host 130 (step 310), which receives the character stream "Dulles" (step 315). The host 130 analyzes the character stream "Dulles" (step 320). The host 130 may perform a local analysis of a character stream to compare the character stream against popular results that are cached on the host 130, while distributing customized queries to specialized databases to identify results of greater relevance. For example, in flow chart 300, analyzing the character stream includes polling a mapping database related to "Dulles" (step 325). Although flow chart 300 depicts one database 140 being accessed, multiple databases may be polled. Examples of other databases that may be polled include, but are not limited to, messaging databases, directory services, yellow pages, and financial databases.

The database 140 receives the poll with "Dulles" (step 330). "Dulles" is then analyzed (step 335), and results are retrieved. For example, multiple maps related to Dulles, Va., could be identified and/or retrieved. This may include a map of Dulles Township, directions to Dulles International Airport, and directions to various corporate offices located in Dulles, Va. The results are then returned to the host 130 (step 340).

Upon receiving the results (step 345), the host 130 exchanges the "Dulles" results with the client (step 350). Exchanging the results with the client may include synchronizing results received from multiple databases and identifying the results of the greatest relevance. For example, multiple databases may be polled to analyze the character stream. The overall number of results returned from the client 110 may be too large for the client 110 to process and/or display. Accordingly, the host 130 may filter and identify only those results relevant to the host. In one example, the most relevant results are returned to the client 110, while the pool of results remains available for analysis in light of subsequently received characters in the character stream. In another example, the results from the databases are received at different times. For example, a query that precisely develops and then matches a user demographic may take longer than a query that compares the results against the most commonly retrieved results. Exchanging the results may include initially presenting the most commonly retrieved results and then subsequently presenting the results of the longer query when the results of the longer query become available.

The client receives the "Dulles" results (step 355) and displays them (step 360). As shown, when the client 110 receives a user selection to launch a mapping application related to "Dulles" (step 365), the client 110 launches a mapping application for the selected "Dulles" results (step 370).

Figure 4:
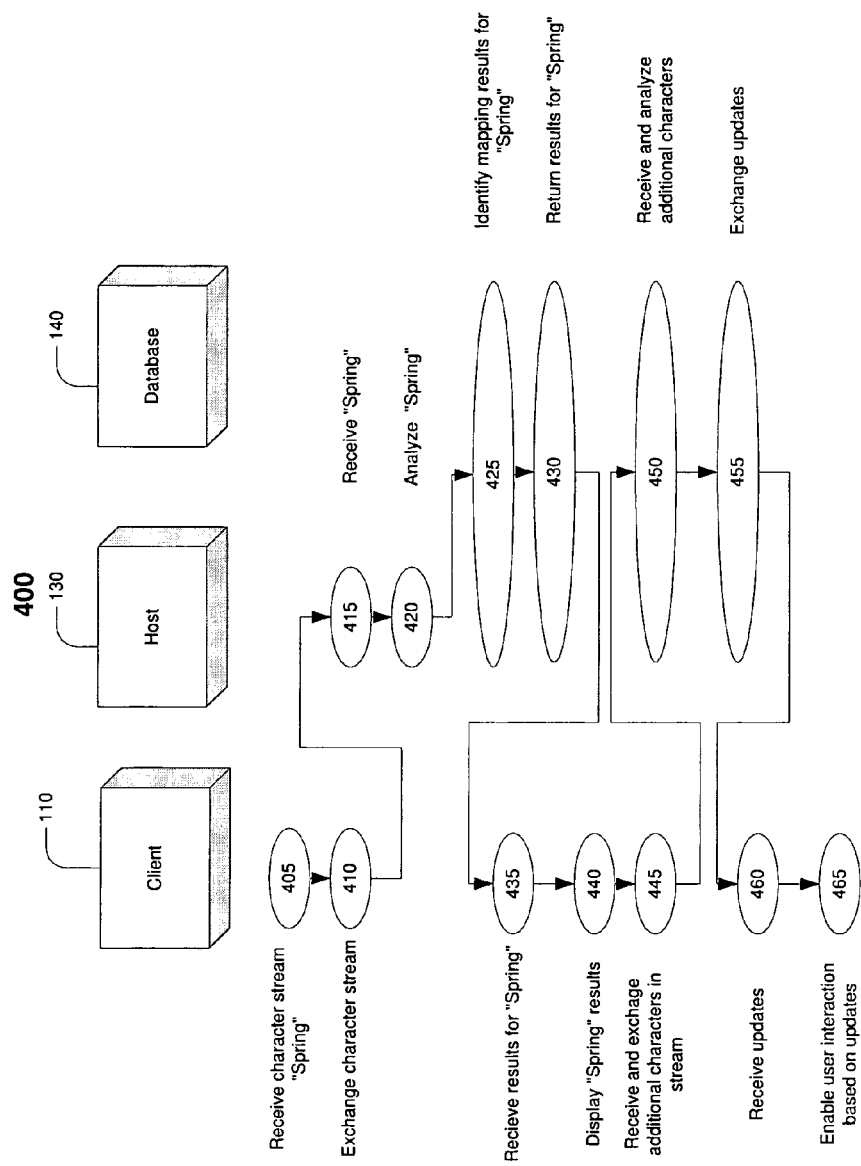
FIG. 4 is a flow chart showing how the client display may be modified based on updates to the character stream.

FIG. 4 illustrates a flow chart 400 showing how the client display may be modified based on updates to the character stream. Generally, the systems and operations shown in FIG. 4 relate to the systems and operations described previously with respect to FIGS. 1-3. However, flow chart 400 illustrates how updates to the character stream may generate different results with which the user may interact. In particular, subsequently received characters in the character stream may generate a different set of results for display by the client. In this manner, the user may modify the character stream and observe in real-time new results based on the modifications.

Initially, the client receives the character stream "Spring" (step 405), and exchanges the character stream 410 with the host 130 (step 410). The host 130 receives the character stream "Spring"(step 415) and analyzes the character stream "Spring" (step 420). The host 130 and/or the database 140 identifies mapping results for the character stream "Spring" (step 425), and returns these results to the client 110 (step 430). The client receives the results related to "Spring" (step 435) and displays them (step 440).

The client then receives and exchanges additional characters in the character stream (step 445). For example, although the string "Spring" may likely identify information related to the several cities of Springfield, the user may enter additional information to confirm that Springfield is what the user has in mind and to identify the Springfield of interest to the user. Thus, the user may enter a field "I" as the next characters to express interest in Springfield, Ill. The host 130 and/or the database 140 receives and analyzes the additional characters (step 450). The host 130 and/or the database 140 generates a new set of results related to the update, which is exchanged with the client 110 (step 455). In the example using Springfield, Ill., mapping and yellow page information related to the town of Springfield, Ill. may be exchanged.

The client 110 receives the updates (step 460) and enables the user interaction based on the updates (step 465). For example, a list of maps, services, and other information related to Springfield, Ill. may be displayed.

Figure 5:
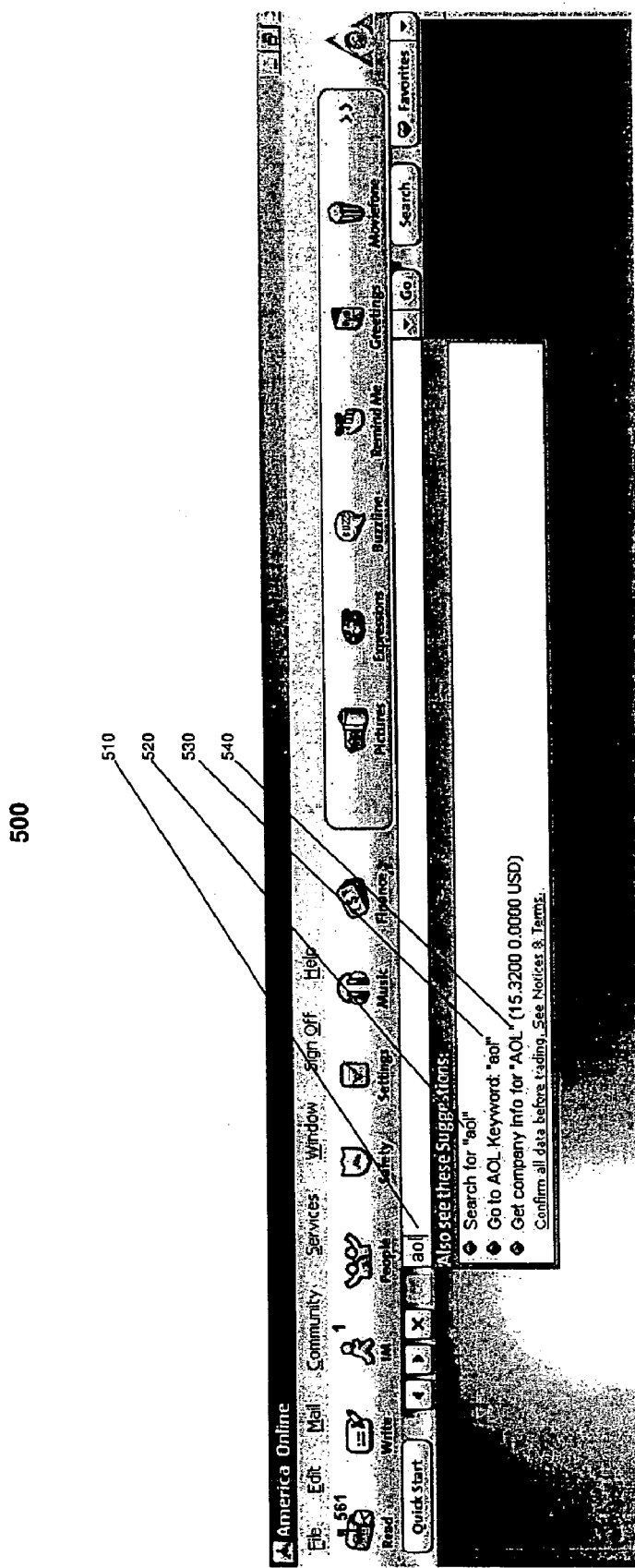

Referring to FIG. 5, exemplary results related to a character stream with noncompletion characters are shown in GUI 500. Generally, GUI 500 may be displayed on a client 110 that was primarily described with respect to FIG. 1 using the operations described with respect to FIGS. 2-4. GUI 500 illustrates code segments that may be invoked in a results page as a character stream is entered in a user application such as a web browser. Specifically, text entry field 510 has received the character stream "aol" without a carriage return as is indicated by the cursor "|". GUI 500 includes a result 520 that enables a search to be launched for the string "aol", a result 530 that enables a code segment to be launched for the AOL Keyword "aol", and a result 540 that enables a code segment that retrieves a stock quote for "AOL", which is shown trading at 15.32 US Dollars on a stock market exchange.

Figure 6:
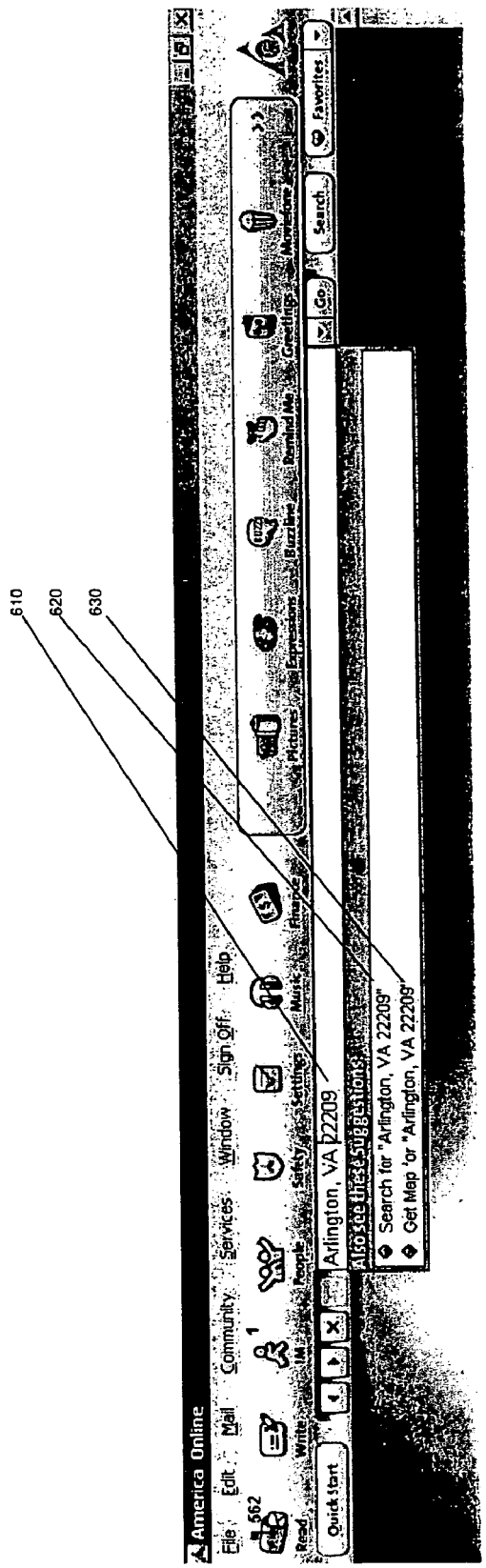

Referring to FIG. 6, exemplary results for the character stream "Arlington, Va. 22209" are shown in GUI 600. Generally, GUI 600 relates to systems, operations, and displays described previously with respect to FIGS. 1-5. However, GUI 600 illustrates the different databases and/or applications that may be accessed from a user application. For example, when "Arlington, Va. 22209" is inserted in text entry field 610, a searching code segment can be launched using result 620 and a mapping code segment can be launched using a result 630.

In one example, the displays related to results 620 and 630 have already been retrieved by the client 110. Alternatively, content in the displays related to results 620 and 630 may need to be downloaded (e.g., from the host 130 and/or the databases 140).

Figure 7:
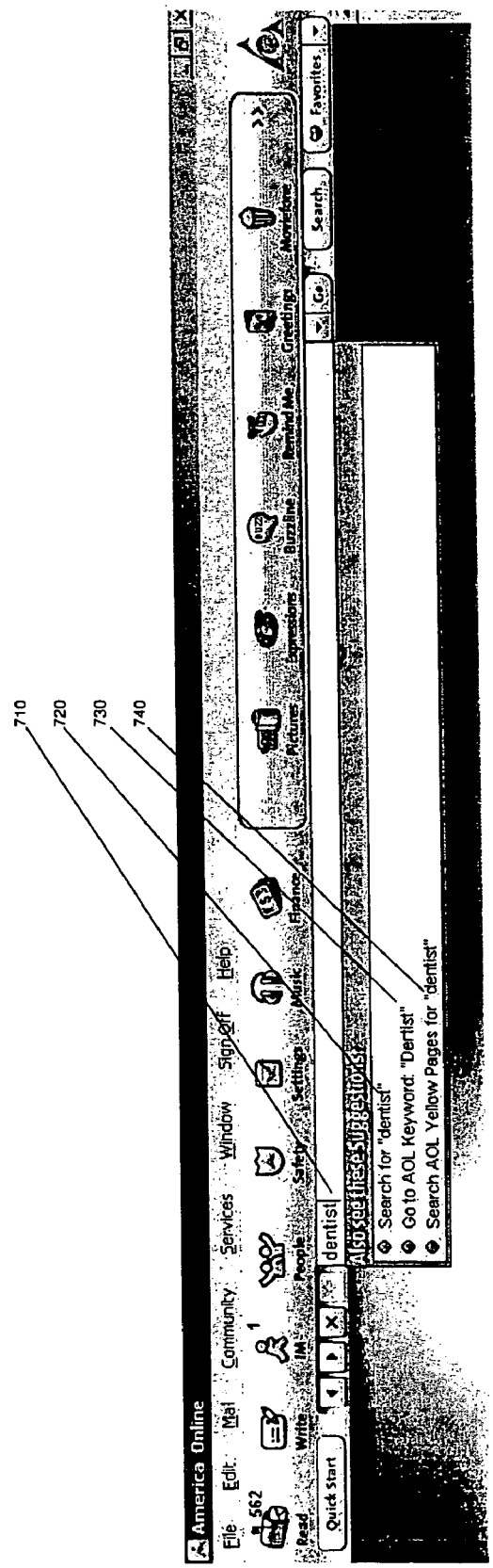

FIG. 7 illustrates a GUI 700 that is related to the character stream "dentist". Generally, GUI 700 relates to the systems, operations, and displays described previously with respect to FIGS. 1-6. However, GUI 700 illustrates how the character stream can be analyzed to identify a yellow page entry related to the character stream.

GUI 700 includes result 710 enabling the user to launch a code segment to search on the character stream "dentist". Note that, although in GUI 700 the character stream includes the complete text for dentist, shorter strings, such as "dentis" or "denti" also may be analyzed and used to generate a result that launches a search on the character strings "denti" or "dentist". Result 720 enables the user to launch a code segment so that the client can "Go to" the AOL keyword "Dentist".

Result 730 enables the user to launch a code segment to search the AOL Yellow Pages for "Dentist". Note that, although result 730 features a result to launch a search of the yellow pages for "dentist", other GUIs may include a list of available dentists. For example, if the user's location is known, a list of dentists in the user's zip code may be presented, with the dentists sorted and presented by specialties. A result from the GUI may be selected to launch the dentist's web page, launch a messaging application to exchange communications with the dentist, or launch a calendaring application to create a dentist appointment.

Figure 8:
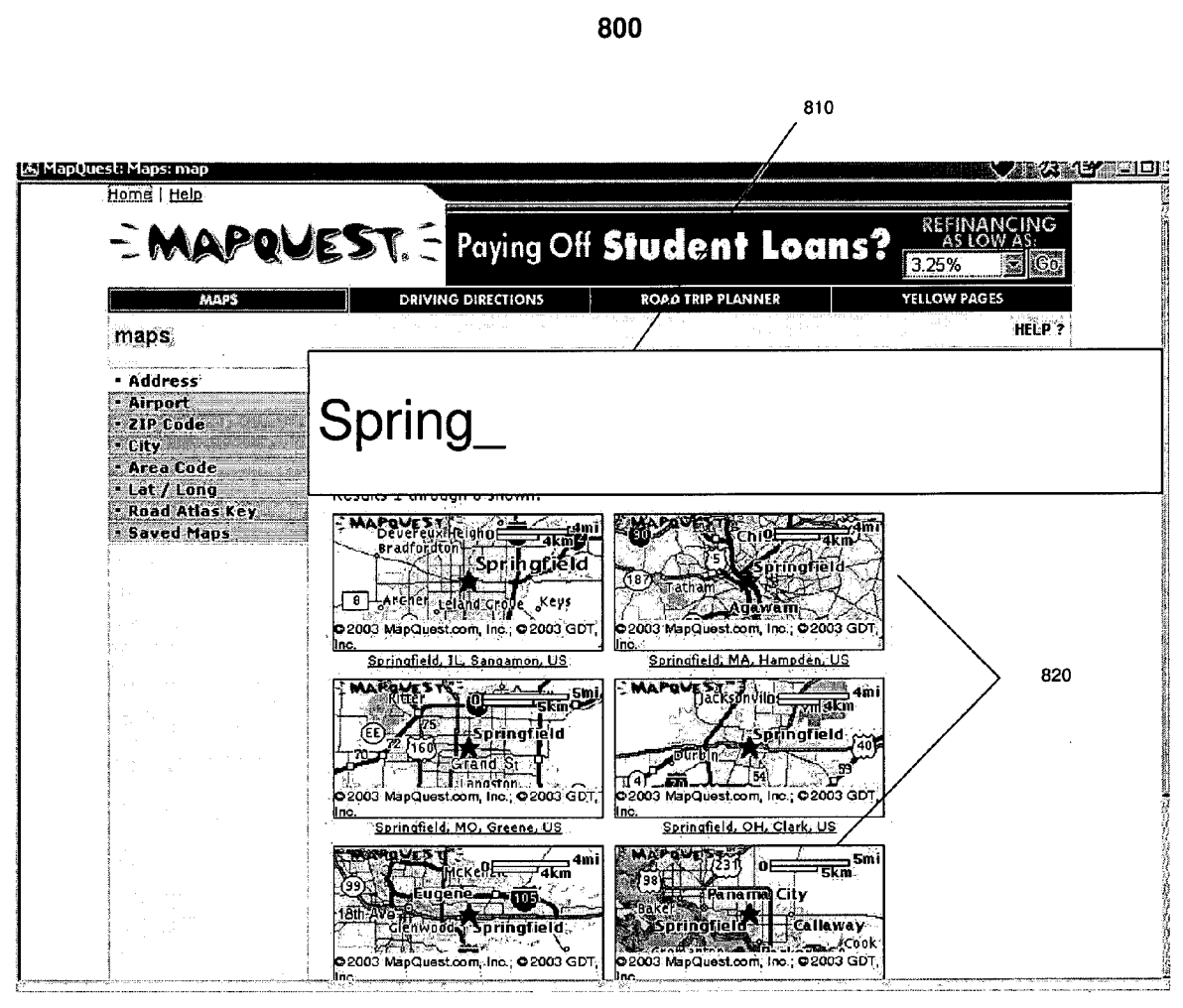
Figure 9:
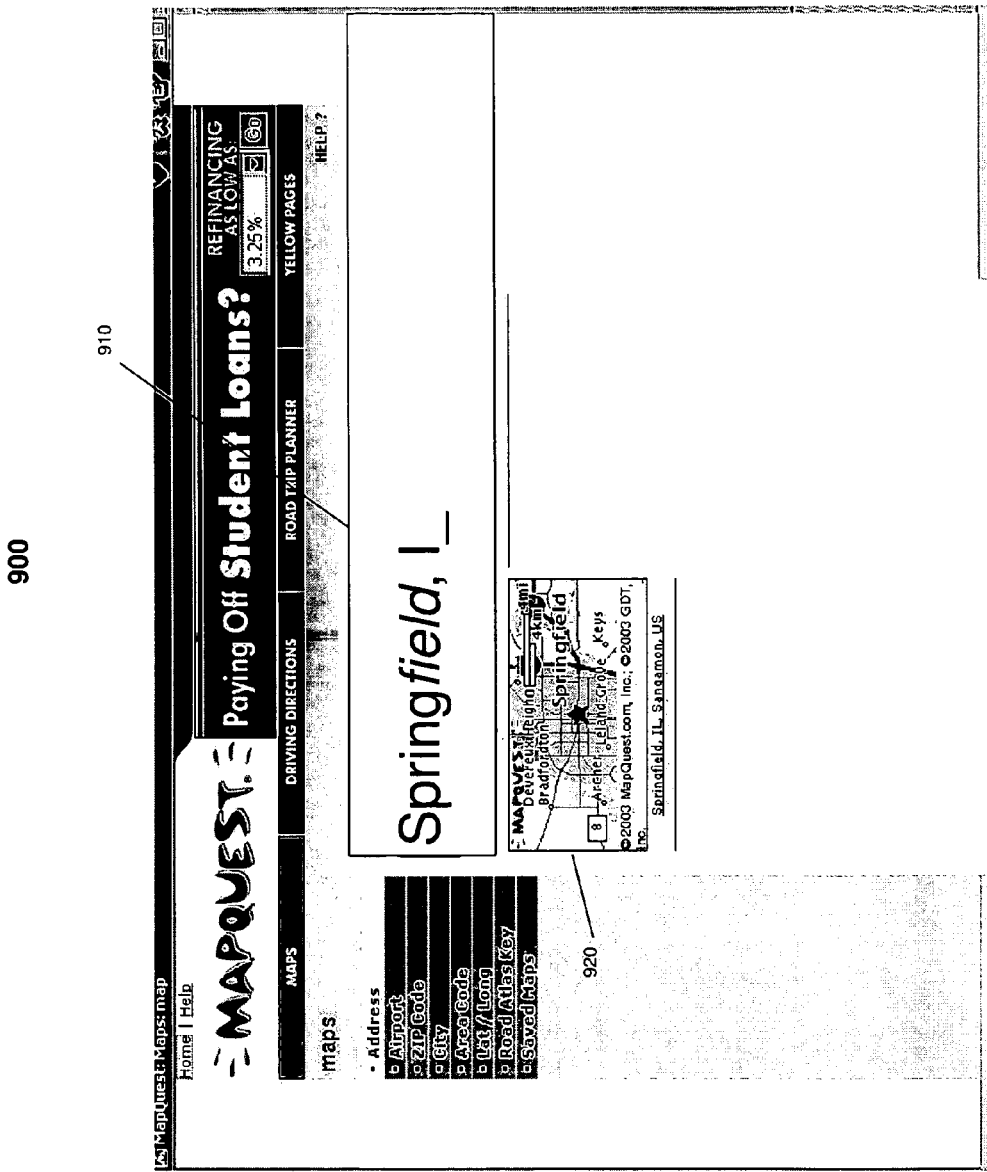

Referring to FIGS. 8 and 9, GUIs 800 and 900 illustrate how the displayed results may be altered as additional characters in the character stream are received. Generally, GUIs 800 and 900 relate to the systems, operations, and displays described previously with respect to FIGS. 1-7. However, GUIs 800 and 900 differ from the previous displays in that the results are not displayed in a drop down window as appeared in FIGS. 5-7. Also, GUIs 800 and 800 illustrate how results may be generated and displayed using a portion of the intended character stream and also how updates to the character stream need not follow the preceding character stream to precisely form the string of interest. GUI 800 shows the multiple results 820 that are available after "Spring" has been inputted into the text entry field 810. GUI 900 indicates that after an "I" is subsequently entered in text entry field 910, the results may be filtered so that only the results 920 "Springfield, Ill." are displayed. Note that none of the intervening characters (e.g., the "field, " in Springfield, Ill.) were included in the character stream.

Although GUIs 800 and 900 indicate that a mapping resource is being accessed, the operations described for FIGS. 8 and 9 are applicable in other applications and environments. Because the user entered the character stream within a mapping application, the results may be tailored to seek map results. This may be performed by searching a mapping database, or by polling a host 130 with a modifier indicating that mapping results should be retrieved. Although GUIs 800 and 900 do not require or allow the user to specify a mapping requirement or restriction, other GUIs may allow the user to specify the databases that are used to analyze the character stream (not shown).

Figure 10:
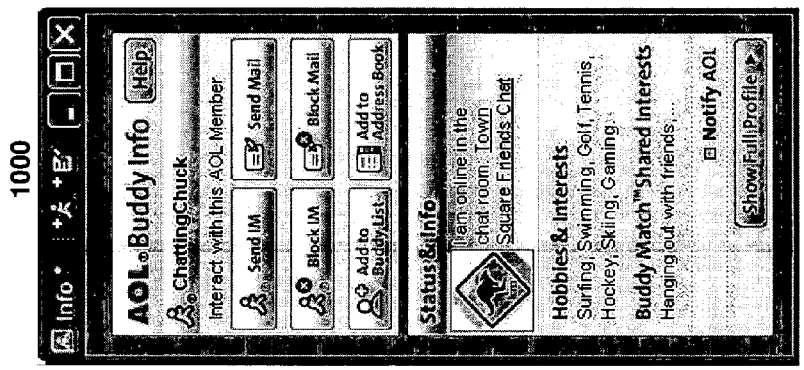

Referring to FIG. 10, GUI 1000 is an exemplary messaging display that enables a user to exchange messaging communications. Generally, GUI 1000 relates to the systems and profiles described previously with respect to FIGS. 1-9. However, GUI 1000 illustrates the messaging results that can be displayed when the character stream relates to messaging information. For example, when a user types in "chattingchuck" in a text entry field (not shown), GUI 1000 may be displayed, enabling the user to send mail, send an instant message, add "chattingchuck" to an address book, block mail and instant messages from "chattingchuck", and/or view the status or interests for "chattingchuck". Although FIG. 10 illustrates the messaging applications or operations related to one user named "chattingchuck", results related to more than one user may be displayed. Similarly, when the user enters an "@" character (the AT character associated with Internet Mail systems), options not related to electronic mail messaging may be removed.

Other implementations are in the scope of the following claims. For example, although the operations described examples of retrieving results that relate to a character stream, the results need not include the information that will ultimately be displayed upon launching a code segment. Rather, the results may include a label that describes the results that may be subsequently retrieved if accepted.

Similarly, the client and host applications may include assistants and spelling correction agents to increase the efficacy of retrieved results. Assistants may help the user by retrieving similar results related to the predicted character stream's meaning. For example, if the character stream includes "German automobiles," results that include prominent manufacturers of German automobiles, including Mercedes, BMW, and Audi, may be retrieved. Spelling correction agents may recognize that the user has likely entered a typographical mistake. In response, the spelling correction agents may correct the character stream by altering the entered character stream on the desktop and/or by retrieving results related to the predicted entry.

Similar to the spelling correction agent, the system may include a validation agent that may be used to validate a URL ("Uniform Resource Locator") entered in the character stream. For example, when the user enters the address for a web site, the web site address may be analyzed to determine if the device and file information actually exists and/or is correct. When the URL information is incorrect, the system may resolve the character stream to identify the correct or related URL address.

The client 110 may be used to intelligently present results related to media communications such as streaming audio and video communications. For example, a content provider or a service provider may be distributing a large number of "channels" or bands of discrete presentations. A user may wish to survey the channels to find channels presenting information most relevant to the user's interests. Accordingly, the user may enter a character stream relating to content the user finds of interest. For audio content, the character stream may relate to an artist, album, or selection (e.g., song) name. For video content, the character stream may relate to a particular news affiliation (e.g., TIME or CNN), show, episode, or subject mater. In any event, regardless of the underlying content, the character stream may be used to retrieve results related to the user's interests as expressed in the character stream. This may be performed by comparing the entered character stream with metadata or subtitles associated with a particular media selection. In one instance, the character stream may be compared with the subtitles for available programming to identify results for the user. Thus, when the user enters the name in a character stream of a newsmaker, the subtitles of all available programming (including on-demand and broadcast streams) may be searched to identify media streams featuring the newsmaker.

The resultant media streams may be presented in a variety of formats. In one example, a drop down menu appears to enable the user to launch a media application related to the retrieved results. In another example, when the media streams include video streams, a tile of video streams similar to the tiled orientation in FIG. 8 may be displayed. The video stream tiles may include reduced bit rate presentations to provide the user with a brief indication of the video content available. When a user selects one of the video tiles, an instance of the video selection at a greater bit rate may be presented.

The systems and operations may be modified to operate in an Intranet or trusted environment. For example, rather than searching public databases, the system may be configured to incorporate security procedures and practices associated with a trusted environment. Thus, a sales employee may be allowed to access customer and marketing databases in analyzing the character stream. Engineering personnel may be allowed to review technical and operational support databases to support their mission, but may be precluded from analyzing the character stream using a sales database. Management and/or investigatory personnel may be allowed to access most or all databases in analyzing a character stream.

The results may be stored on the client 110 and/or the host 130. For example, the host 130 may cache previously returned results that may be used when analyzing subsequent character streams. In another example, previously selected results may be stored on the client and subsequent character streams may initially be accessed using the previously-stored results.

The client 110 may enable the user application to launch a messaging code segment. Alternatively, the user may be entering the character stream in a messaging application. For example, the user may be entering a character stream in an instant messaging application. The instant messaging application may transmit the character stream to a host 130 for analysis. The client 110 may receive the results and enable the client to transmit an instant message when the results indicate that an identified user is online.

Exchanging the updates may include exchanging only the portion of the character stream that has changed since the character stream was last exchanged. For example, as a user initially types in information into a first application, the first application may send a message to the host 130 with the initially entered character stream (e.g., "Spring"). As the user enters updates to the character stream (e.g., by typing "field" after "Spring"), the client 110 may send the new information without sending the old information (e.g., the client 110 subsequently sends "field" instead of "Springfield"). Alternatively, the client 110 may send the current character stream. For example, the client 110 may first send "Spring" and then later transmit "Springfield".

The client 110 and/or host 130 may determine that there are no relevant results and operate to preclude additional processing resources from being used. For example, the user may be entering character streams for which the host 130 has no information and generates no results. When the host 130 determines that there is no information, the host 130 may interface with the client 110 to prevent additional updates from being exchanged. Such a condition occurs when the user enters a character stream that does not relate to content accessible by the host 130. For example, the host 130 may determine that CHARACTERSTREAM1 will not yield any results, and no extension of CHARACTERSTREAM1 will yield any results. If the user enters additional information, such as CHARACTERSTREAM123, the first application will not send any updated information to the host 130. However, if the user uses the DELETE key to modify the character stream so that CHARACTERSTREAM1 is changed to CHARACTERSTREAM, the character stream may be exchanged.

The client 110 may perform preliminary analysis to preclude common character streams from being analyzed where the common character stream generates results that are not responsive to the predicted interest of a user. For example, when "the" appears in a character stream, particularly in an initial portion of the character stream, generating results using the character stream "the" likely generates too many results, few, if any, of which are responsive to the predicted interest of the user. Accordingly, exchanging the character stream may be delayed until the character stream is meaningful. Thus, exchanging the character stream "the" may be delayed until character stream reads "the Greek islands" or another character stream likely to generate meaningful results. Similarly, the character stream may be restructured to remove strings in the character stream not likely to assist in the analysis (either on the client 110 or the host 130). Thus, strings appearing in the character stream such as "the", "a", and "this" may be removed from the character stream prior to exchanging the character stream.

Displaying the results may include displaying the results directly in addition to displaying a label for the results that enables a code segment for the results to be launched. For example, the results may include an actual stock quote rather than a label for a code segment that generates a stock quote. The displayed result may include a capsule or brief summary for a news item. The capsule also may be configured to retrieve a more detailed article on the news item when the user selects the news item.

Figure 11:
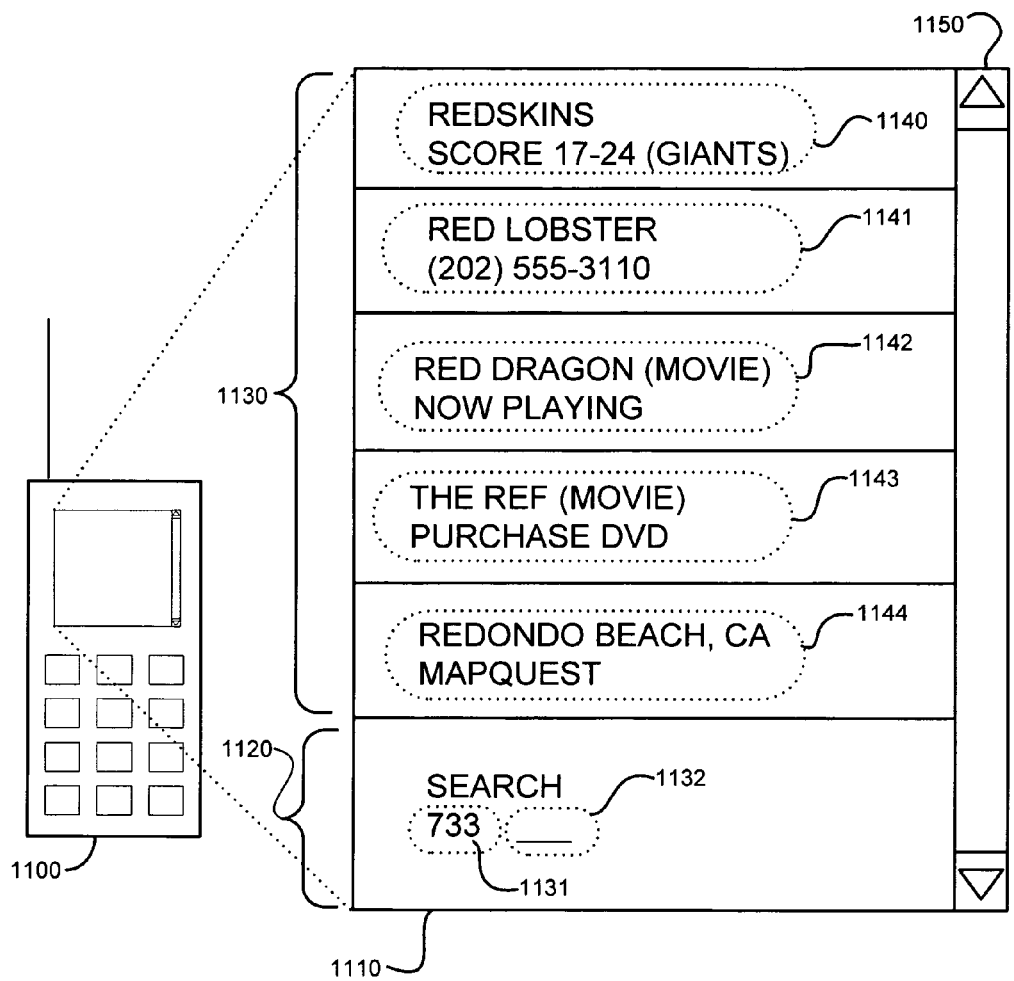
FIG. 11 illustrates a mobile device that may be configured to return results related to an ambiguous character.

Although many of the operations were described with respect to a character stream received on a personal computer, the operations also may be performed in response to receiving one or more characters (e.g., a sequence of ambiguous characters) from a device with a limited display and/or a reduced-entry keypad (e.g., a wireless handset or telephone). For example, FIG. 11 illustrates a mobile device 1100 that may be configured to return results related to an ambiguous character. In particular, mobile device 1100 is configured to enable a user to select a sequence of one or more ambiguous characters on a reduced-entry keypad. The mobile device 1100 exchanges the sequence of ambiguous characters with a host and presents results responsive to a predicted interest. To enable better perception of details, mobile device display 1110 has been projected to offer a larger rendering of mobile device display 1110.

Mobile device display 1110 includes an input display 1120 and a results display 1130. Input display 1120 enables user perception of ambiguous characters that have been entered and results display 1130 enables user perception of results responsive to a predicted interest of the user. As shown, input display 1120 indicates that ambiguous characters "733" have been entered where "7" and "3" represent ambiguous characters appearing in a keypad on a mobile device 1100. The characters "7" and "3" are ambiguous in the sense that the number "7" also may represent the letters "P", "Q", "R", or "S" in addition to representing the number "7", and the number "3" may also represent the letters "D", "E", or "F" in addition to representing the number "3".

The results display 1130 renders results related to the ambiguous characters that have been entered. In particular, the mobile device 1100 may provide a sequence of one or more ambiguous characters to a host (not shown). In turn, the host may analyze the sequence of ambiguous characters, identify results responsive to a predicted interest of the user, and return the results to the mobile device. Using the results, the mobile device 1100 is configured to render the results in the results display 1130.

As shown, a host has determined that a user entering "733" may be searching for information related to the term "Red", such as the Washington Redskins. For example, a host may determine that the ambiguous character "7" represents "R", ambiguous character "3" represents "E", and ambiguous character "3" represents "D."

Results 1140-1144 represent one or more applications that may be launched in response to user selection of one or more of the results. In response to the host determining that the user entering ambiguous characters "733" is likely interested in terms that include and/or begin with "RE" or "RED", the mobile device 1100 displays results 1140-1144 in results display 1130. The first result 1140 shows the score of a Washington Redskins football game and includes a link to retrieve additional information about the Redskins game. The second result 1141 includes results from a directory service application and includes a telephone listing for a Red Lobster. A user may select the second result 1140 to call the listed telephone number. The third result 1142 includes movie information for the movie "Red Dragon." The third result 1142 may be selected to purchase of tickets or provide movie listings in response to selection by a user. The fourth result 1143 includes an activation code segment structured and arranged to enable a user to purchase a DVD of the movie "The Ref." The fifth result 1144 includes a link that may be selected in order to retrieve and present a map of Redondo Beach, Calif.

The mobile device display 1110 also includes a scroll bar 1150. The scroll bar 1150 may be used to indicate and access more results than may be rendered in the results display 1130.

In one implementation, mobile device 1100 renders results 1140-1144 in response to determining that the results 1140-1144 are the most popular results for the sequence of ambiguous characters "733". Alternatively or in addition, results may be responsive to a particular user (e.g., a host has determined that a particular user is a Redskins fan). In yet another variation, the mobile device 1100 renders results responsive to a location for a mobile device. More precisely, a sequence of ambiguous characters may be analyzed using location information for the mobile device 1100. For example, a host may receive location information for the mobile device 1100 (e.g., proximity to a restaurant district that includes a Red Lobster Restaurant) and return results for proximate restaurants related to the sequence of ambiguous characters.

As shown, input display 1130 includes a cursor 1132. Cursor 1132 illustrates that additional ambiguous characters may be exchanged in the sequence of ambiguous characters. Additional ambiguous characters may be used to further disambiguate results.

Figure 12:
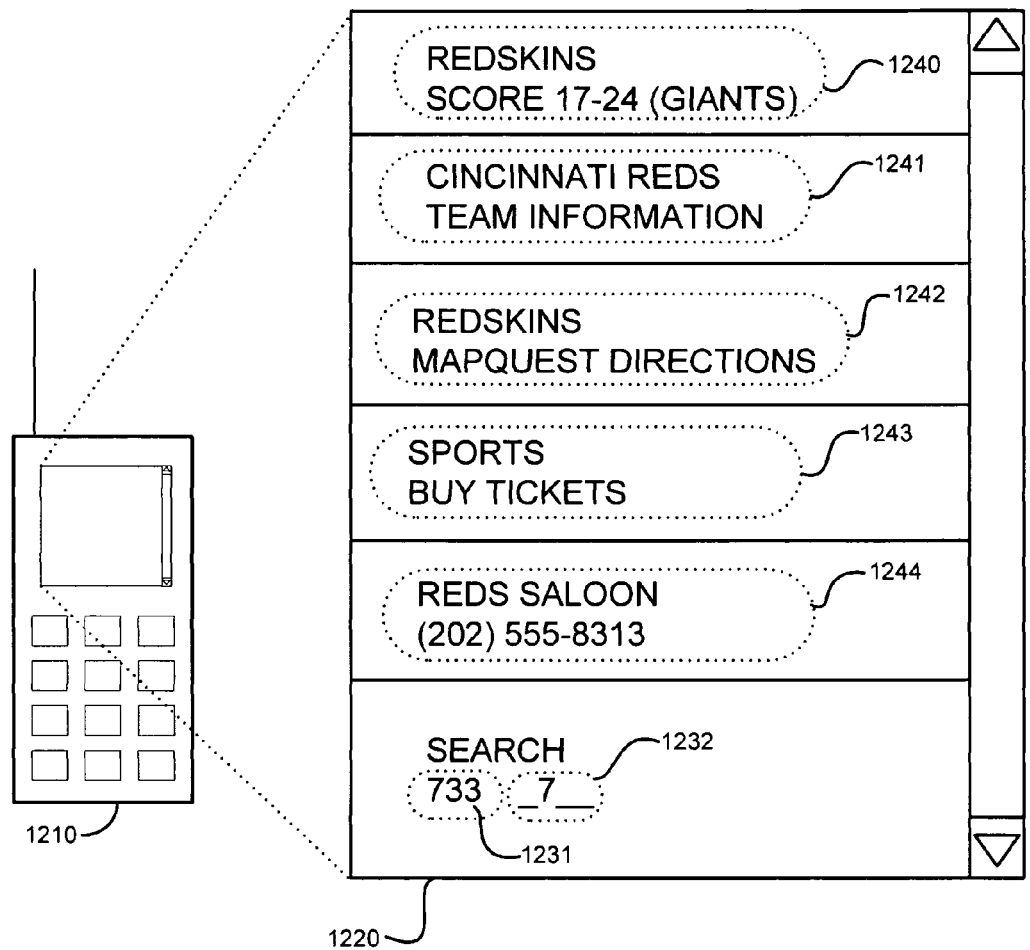
FIG. 12 illustrates a mobile device configured to return results responsive to additional input of ambiguous characters after initially presenting results responsive to ambiguous characters.

For example, FIG. 12 illustrates a mobile device 1200 configured to return results responsive to additional input of ambiguous characters after initially presenting results responsive to ambiguous characters. Generally, the mobile device 1200 relates to the mobile device 1100 described with respect to FIG. 11. However, the mobile device 1200 illustrates how results appearing in results display 1230 may be modified in response to receiving an additional ambiguous character. A host may use the additional ambiguous character to more precisely tailor results.

As shown in input portion 1220, the mobile device 1200 indicates that a "7" has been entered in addition to the "733" shown in FIG. 11. As a result, the sequence of ambiguous characters 1231 is "7337". Using "7337" as a sequence of ambiguous characters, the mobile device 1200 renders results 1240-1244 in results display 1230.

While the first result 1240 in FIG. 12 is similar to the first result 1140 in FIG. 11 (updated with a current score), other results may differ from results 1140-1144 shown in FIG. 11 to reflect the addition of another ambiguous character. For example, the results display 1230 no longer includes results that include the completed word "Red" such as "Red Lobster" or "Red Dragon", in contrast to results that merely include "red" as a sequence of characters (e.g., Redskins). Reflecting the addition of "7" to the sequence of ambiguous characters, the second result 1241 includes a link to information about the Cincinnati Reds. Note that on some keypads, a "7" key also may represent the characters "P", "Q", "R", and "S" in addition to the number 7. Thus, "7337" may represent the "REDS". Also, the second result 1241 illustrates that a result need not be limited to results that begin with the sequence of ambiguous characters. For example, the second result 1241 relates to an entry that begins with "Cincinnati."

The third result 1242 includes an application that may be selected to receive driving directions to a Washington Redskins venue. The fourth result 1243 includes a program that may be selected to buy tickets for sporting events. The fifth result 1243 includes results from a directory service application and includes a telephone listing for a "Reds Saloon."

Although FIGS. 11 and 12 illustrate actual results being rendered, a stem also may be rendered. A stem may represent a portion of a term or result. To the extent that a stem is used in multiple results, selecting a stem may be used to render multiple results and/or additional stems appearing after or based upon a present stem.

Figure 13:
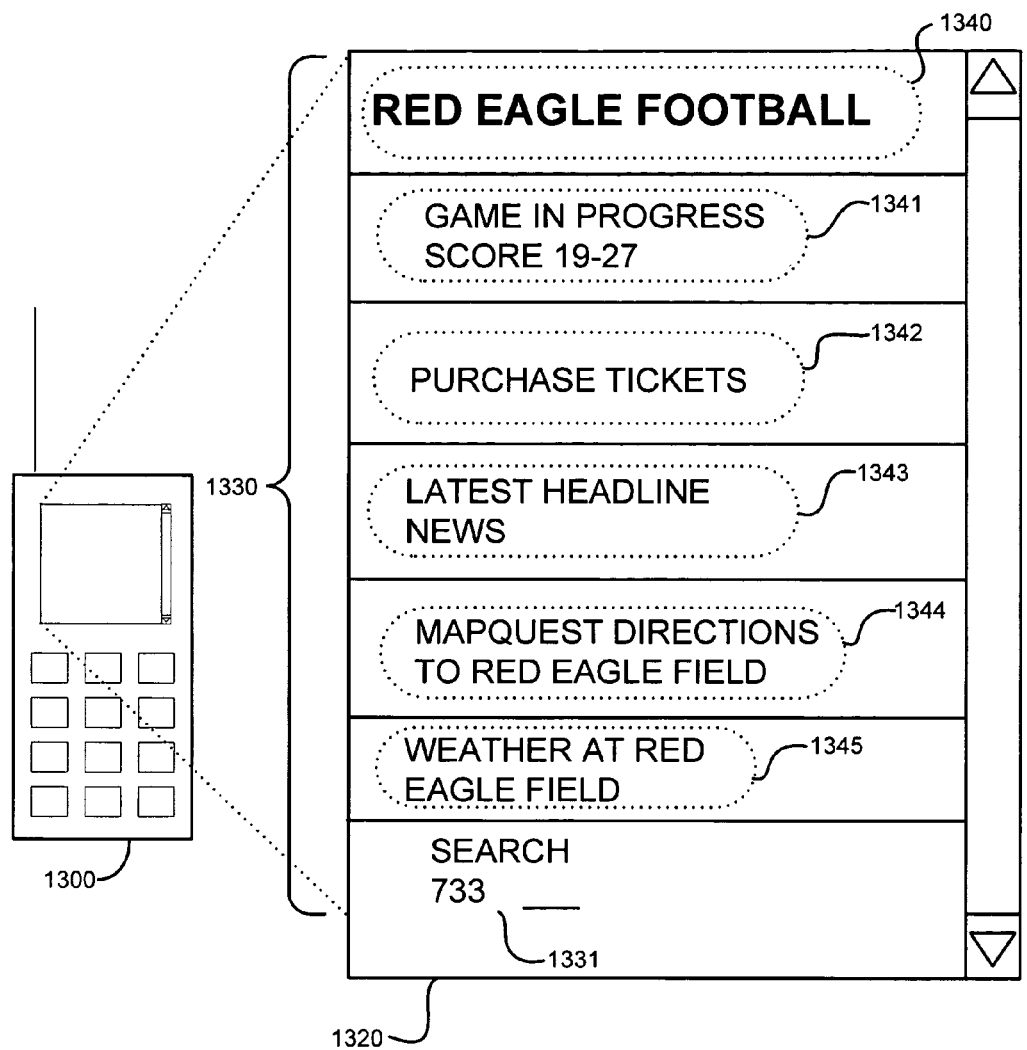
FIG. 13 illustrates a mobile device configured to return results responsive to the input of a space character after initially presenting results responsive to a sequence of ambiguous characters.

While FIGS. 11 and 12 illustrate that a sequence of ambiguous characters may be resolved without specifying a structure for a term (e.g., length), a user may use a special character such as a "space" character to resolve an ambiguous character stream. FIG. 13 illustrates a mobile device 1300 configured to return results responsive to the input of a space character after initially presenting results responsive to a sequence of ambiguous characters. The input of a "space" character may be used to delineate term boundaries in a sequence of ambiguous characters, such as indicating whether a user is interested in results that are related to the completed word "red" rather than words that merely include the word "red" (e.g., the Washington Redskins). The results display 1330 may be modified to show only Red Eagle related results. The results display 1330 differs from the results display 1130 of FIG. 11 in that all of the results 1341-1345 are Red Eagle related results, whereas results display 1130 only includes one Redskins-related result. The results display 1330 includes a header 1340 represented by the "Red Eagle" title to aid user perception that all results are Red Eagle-related. Although a space may be used to indicate a degree of acceptance of the results rendered, other results also supported by the sequence of ambiguous characters with the space also may be rendered. For example, results related to "SEE" also may be returned where "733" has been entered.

A user may use a "next word" key to advance through different stems. For example, although "RED" may represent a likely word step, a user may use a soft key to advance through other stems. In the case of "733", the stems may include "REF", and "SEE". As a result of the user advancing through different stems, the stem to which a user advanced may be determined to be a stem most likely responsive to a user's predicted interest, and thus, rendered before other stems.

The first result 1341 in the results display 1330 is similar to the first result 1140 of a sporting event referenced in FIG. 11. The "Red Eagle" may be filtered out or reduced as a result of the header 1340 rendering "Red Eagle." The second result 1342 includes an application that may be selected to purchase tickets to a Red Eagle game. The third result 1343 includes an application that may be selected show the latest headlines and news information about the Red Eagles. The fourth result 1344 includes an application that may be selected to receive driving directions to Red Eagle Field. The fifth result 1345 includes an application that may be selected to receive information about weather conditions at Red Eagle Field.

Inputs other than a space character may be used to resolve a sequence of ambiguous characters. In one implementation, a sequence of ambiguous characters may be resolved by, for instance, inputting a non-alphanumeric character such as "−" or "@" from a page of symbols, or by pressing an arrow button on a mobile device.

The results in result displays 1130, 1230, and 1330 may be selected by a user. When a user selects a result, the mobile device is typically configured to perform a particular action responsive to the result selected. For example, in order to obtain more information about a Red Eagle football game, a user may select result 1341 in FIG. 13.

Figure 14:
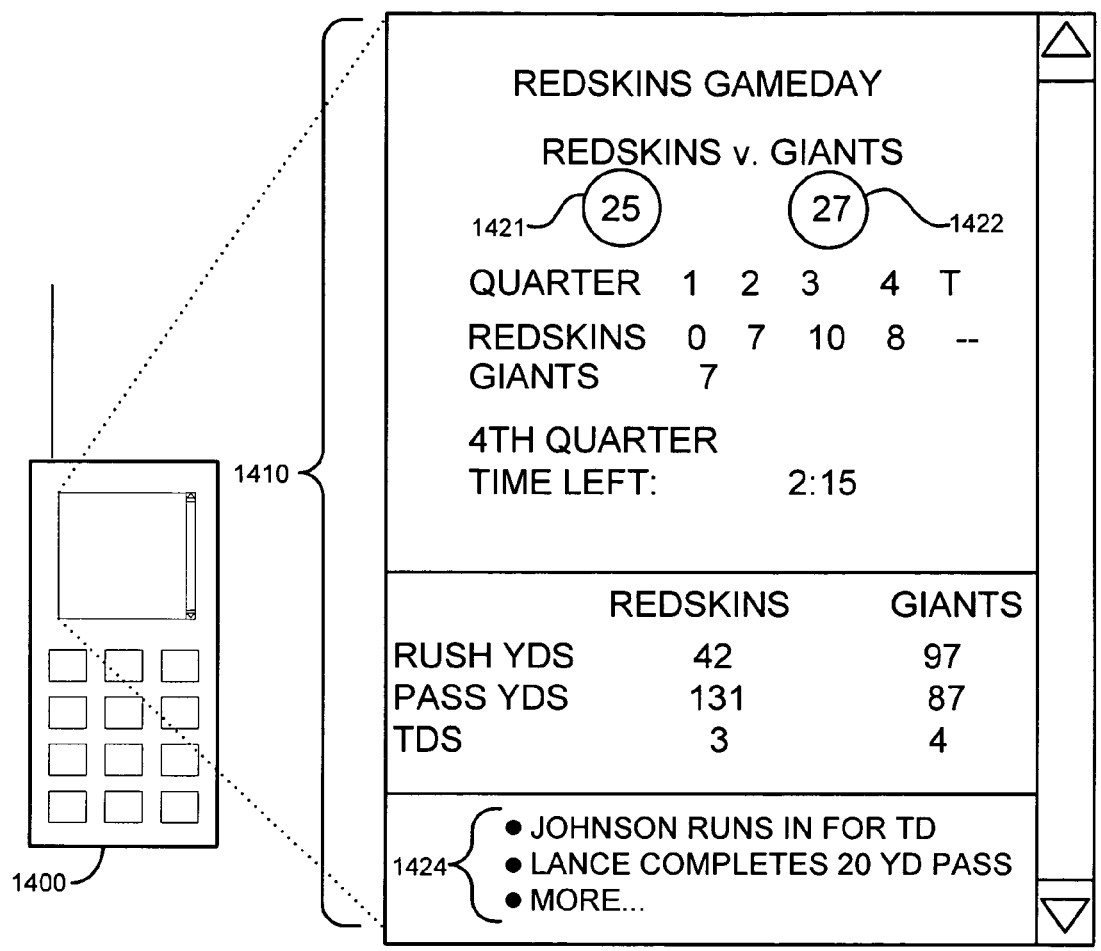
FIG. 14 illustrates a mobile device configured to display information related to a result that has been selected.

Exemplifying a display that may be displayed responsive to selecting a result, FIG. 14 illustrates a mobile device 1400 configured to display information about a football game in progress. The game information includes the Redskins score 1421, the Giants score 1422, a variety of game statistics 1423, and a play-by-play information section 1424.

Figure 15:
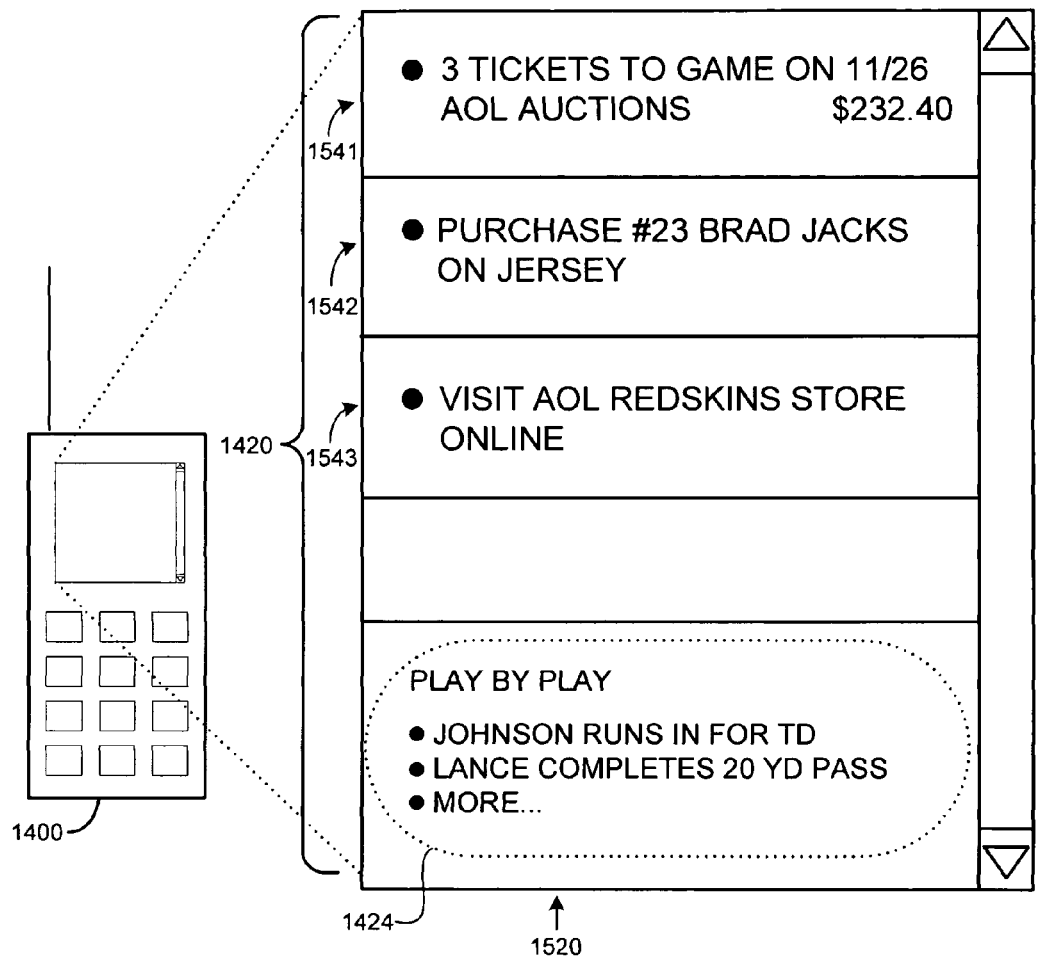
FIG. 15 illustrates a mobile device configured to display advertisements associated with user inputs.

FIG. 15 illustrates a mobile device 1500 configured to display advertisements associated with user inputs. The advertisements 1541-1543 shown in the mobile device display 1510 correspond to products and services that are related to the Washington Redskins. The first advertisement 1541 represents a classified advertisement and offers three Redskins tickets for sale. The second advertisement 1542 offers a Redskins jersey for sale. The third advertisement 1542 is an advertisement to visit an online store that sells Redskins paraphernalia.

In one implementation, mobile device 1500 renders advertisements 1541-1543 in response to the user selecting a result. Alternatively, or in addition, advertisements may be responsive to a sequence of ambiguous characters. For example, prior to narrowing a-search to return only Redskins results, advertisements may have been displayed offering Red Lobster discounts. The advertisements also may be responsive to a particular user, for example, where the shopping habits of the particular user are known.

Figure 16:
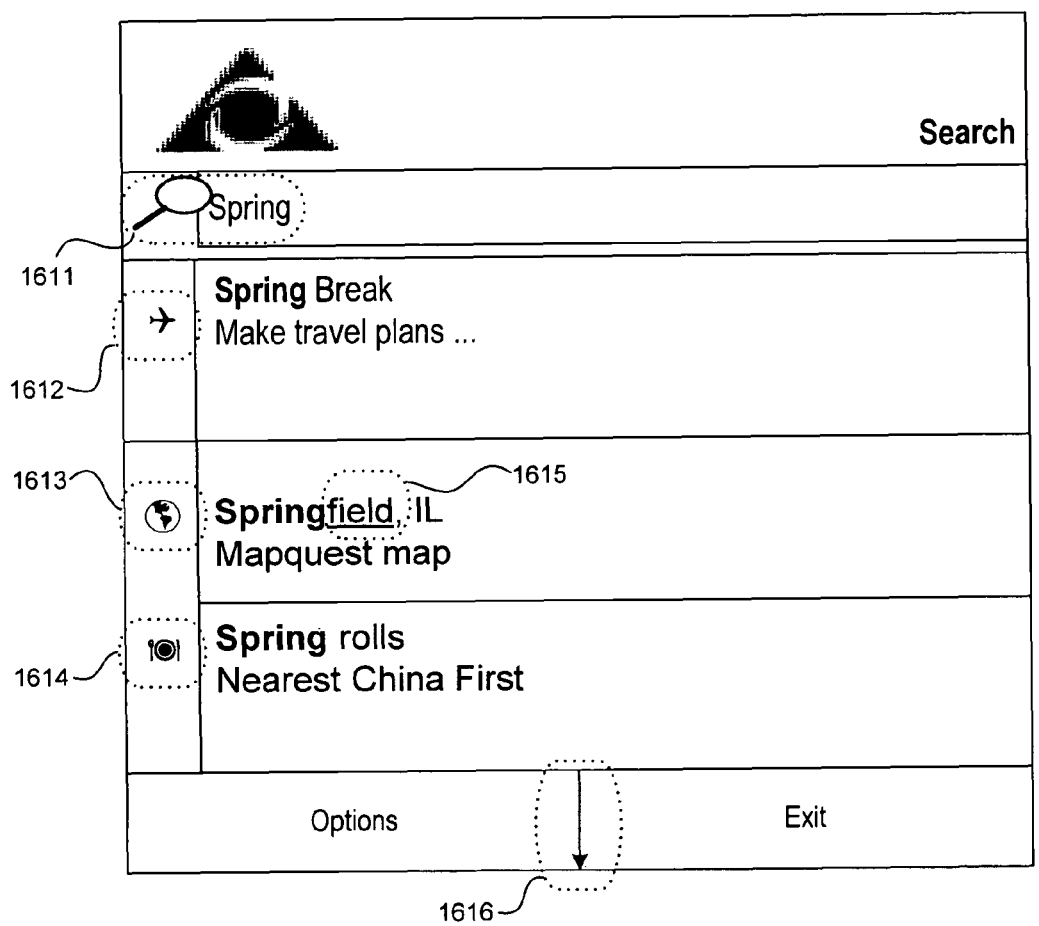
FIG. 16 illustrates a mobile device display for a mobile device that is configured to return results related to one or more ambiguous characters.

FIG. 16 illustrates a mobile device display 1600 for a mobile device that is configured to return results related to a sequence of ambiguous characters. Results 1611 renders a sequence of ambiguous characters. The results 1611 display the text "Spring", representing one result responsive to the sequence of ambiguous characters "777464". In one implementation, the results rendered in the results 1611 relate to one or more results. In another implementation, the results 1611 are responsive to a user preference and/or profile. For example, as shown FIG. 16, the mobile device may render "Spring" where a user inputs the sequence of ambiguous characters "777464" when the user's location is determined to be proximate to Springfield, Ill.

FIG. 16 also illustrates the use of icons to provide an indicate of an application invoked in response to selecting a particular result. Icons 1612-14 are displayed in association with each result. Icon 1612 displays an airplane icon in association with a first result to indicate that selecting the first result launches an application for planning and arranging travel. Icon 1613 displays a globe in association with a second result to indicate that selecting the second result launches a mapping application. Icon 1614 displays a table icon in association with a third result to indicate that selecting the third result launches a restaurant application. Although the operations were described with respect to an application that is launched, the result also may relate to an object such as content (e.g., a ring tone or an audio clip).

The mobile device display 1600 includes a special symbol 1616 (e.g., a downward arrow symbol) that corresponds to a button on the mobile device. Using a button related to a special symbol, a user may advance through the results and view additional results beyond those rendered on the mobile device display 1600. Also, the mobile device display 1600 may include one more "shortcuts" for a user to select a particular result. As shown, the substring "field" from the string "Springfield" is underlined in the second result displayed on the mobile device display 1600. The underlined text indicates that a user may select the second result by inputting the character "f" or by inputting an ambiguous character that corresponds to "f" such as the number "3."

Figure 17:
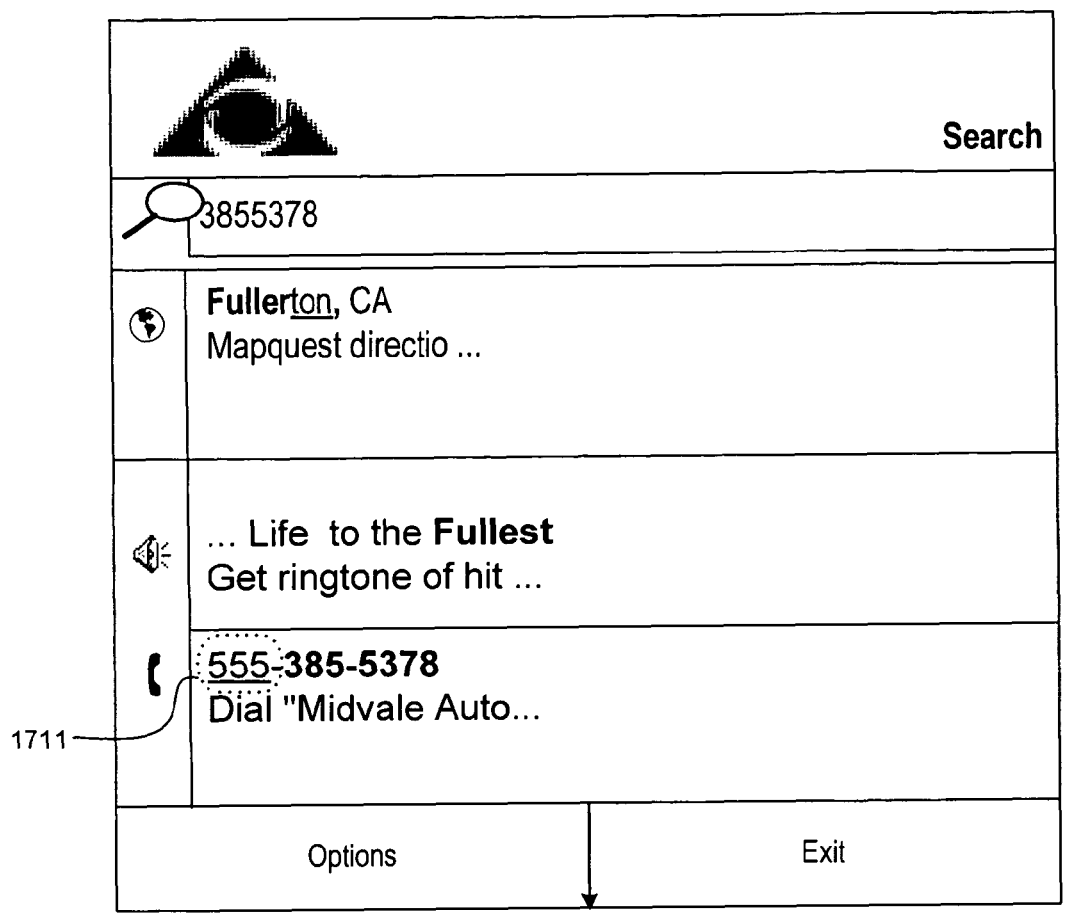
FIG. 17 illustrates how a "shortcut" may relate to characters appearing at the beginning of a disambiguated term.

FIG. 17 illustrates how the results may change after each input to narrow results. For example, "Fullerton, Calif." becomes more likely, moving from second to first position, while "Dulles" is eliminated from consideration, when the "8TUV" key is added to the input sequence. The third result in the second display currently labeled 1711 illustrates that the input sequence "3855378" may retrieve reasonable results even though in this case the sequence did not also match the area code preceding the phone number.

In FIG. 16, the underlined portion of text relates to subsequent characters that have not yet been entered in the sequence of ambiguous characters. FIG. 17 also illustrates how analysis may return results related to characters that have not been entered that appear at the beginning of a disambiguated term. In another implementation (not shown), a result with the underlined characters may be selected to use the selected result as a term. In yet another implementation, the underline characters represent a "shortcut" to "keys" that may be selected. Other substrings related to other results may be underlined to indicate a shortcut to other results. For example, when the underlined text represents a selectable shortcut, the third result illustrates that after 555-(1711) has been entered, a "5" may be entered to select an application related to phone number "555-385-5378".

In one implementation, a selection shortcut is indicated as a digit next to each result (not shown). The user may press a key to indicate entry is complete and enter a selection mode, and then press the key corresponding to the digit next to the desired result. On another device, the user may be required to hold down the corresponding key for a period of time (e.g., 1 second or longer) rather than entering a separate selection mode. On a touch-screen device a user may tap directly on the desired result to invoke the default action or display a menu of choices.

Special input keys, such as a soft key, may be used to rapidly navigate results. For example, a first special character may be used to only display contact information used to file out (e.g., pressing "#" only returns results from an address book or a directory service application) while a second special character may be used to filter out other results (e.g., pressing "*" removes results related to an address book application or a directory service application). Alternatively or in addition, entering a special character may be used to automatically select a result (e.g., pressing left arrow selects a mapping application).

Additional shortcuts may be available to rapidly navigate results such as a dedicated key, a mode-specific key, or a menu option configured to reduce the number and type of results. For example, selecting the "Options" menu item labeled "Show Contacts" while the results are displayed may filter out any items not offering contact information. Alternatively, the results of a search may be passed to an application the user invokes; for example, if the user presses a dedicated "Web" key, a browser may be launched that has related web addresses ready for selection.

Figure 18:
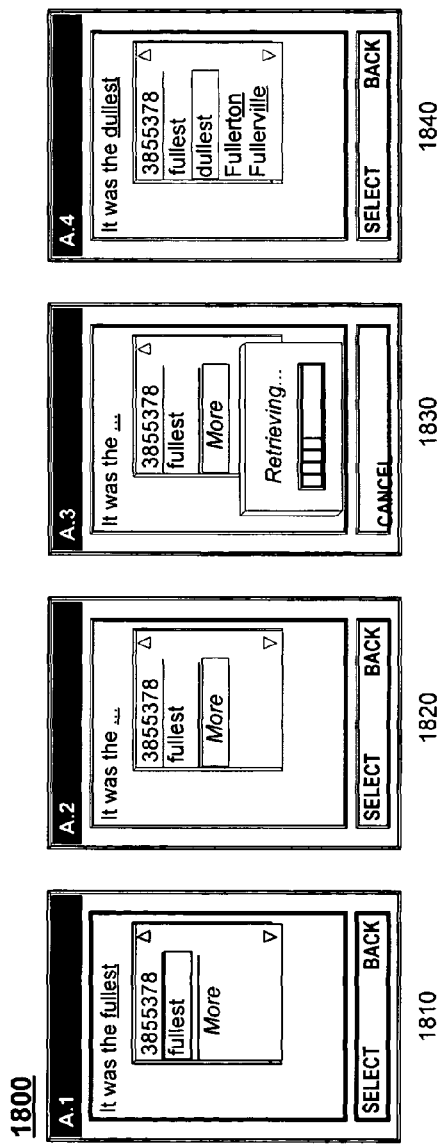
FIG. 18 includes four exemplary mobile device displays illustrating how a sequence of ambiguous characters may be entered and analyzed to generate a term as a result for inclusion in a text message.

FIG. 18 includes four exemplary mobile device displays illustrating how a sequence of ambiguous characters may be entered and analyzed to generate a term as a result for inclusion in a text message. First mobile device display 1810 indicates that "3855378" has been entered. First mobile device display 1810 also includes results. In one implementation, selecting a result may execute an application on the mobile device. In another implementation, selecting a result may include initially executing an application on a host and/or presenting data resulting from execution of the application on the host.

Mobile device display 1820 indicates that the sequence of ambiguous characters may be resolved to "3855378" and "fullest". A "More" banner is displayed below the results. A user may select the "fullest" result from the results to insert the string "fullest" into a text message. Alternatively and as illustrated in the second mobile device display 1820, a user may select the "More" banner in order to render additional results. Subsequently, as illustrated by the "Retrieving" banner and a corresponding progress meter in the third mobile device display 1830, additional results are rendered. Mobile device display 1840 displays additional results. For example, a mobile device may use a local processing capability to present first results and retrieve additional results accessed from a host in response to a user request for additional results.

Results may be retrieved from specialized databases depending upon a manual or automatic determination of the information needing disambiguation. For example, if the user is a medical specialist and typically uses a lot of medical terms that are not stored locally, the user may select a medical terms mode or the preliminary analysis code segment may determine that medical terms have been used in the past and that a remote medical terms database will be used to analyze the sequence of ambiguous characters. Other specialized databases include legal terms, personal address books, or AOL keywords. Still, other databases may include common misspellings, or current words and phrases such as slang and news headlines.

Figure 19:
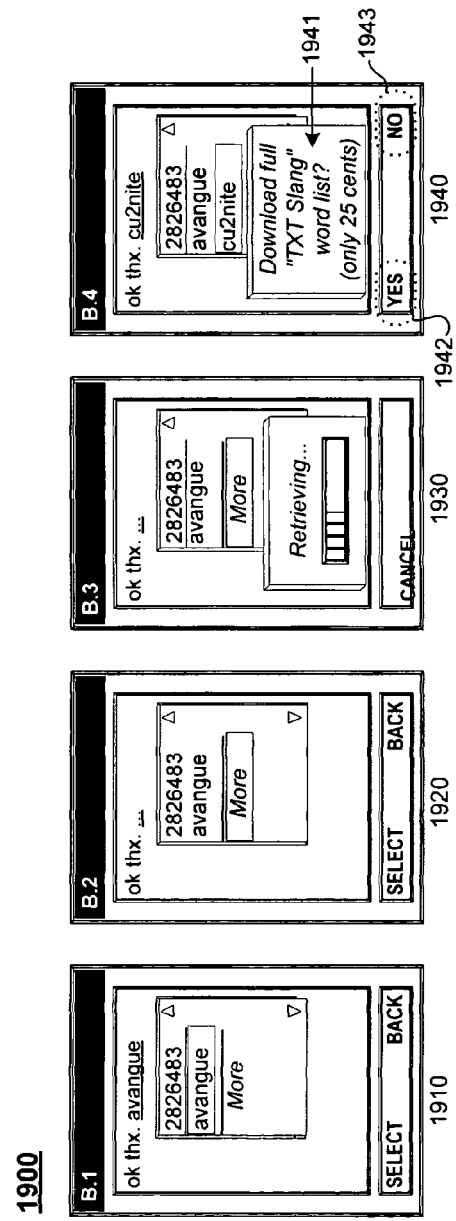
FIG. 19 includes four exemplary mobile device displays that are associated with a mobile device configured to receive one or more ambiguous characters and retrieve results responsive to the ambiguous characters.

Similar to FIG. 18, FIG. 19 includes four exemplary mobile device displays that are associated with a mobile device configured to receive a sequence of ambiguous characters and retrieve results responsive to the sequence of ambiguous characters. Mobile device display 1910 indicates that "2826483" has been entered as a sequence of ambiguous characters. Mobile device display 1910 includes results with the character sequences "2826483" and "avangue." A "More" banner is rendered below the results. Mobile device display 1920 and mobile device display 1930 illustrate how a display may be modified as a result of a user selecting a "More" banner with a host retrieving additional results.

Mobile device display 1940 includes additional results retrieved from a host. The results include a "slang" term "cu2nite". Mobile device display 1940 also includes a prompt 1941 to download a "TXT Slang" dictionary for twenty-five cents. A user electing to download the dictionary may select the "yes" input 1942 while a user not electing to download the dictionary may select the "no" input 1943.

Figure 20:
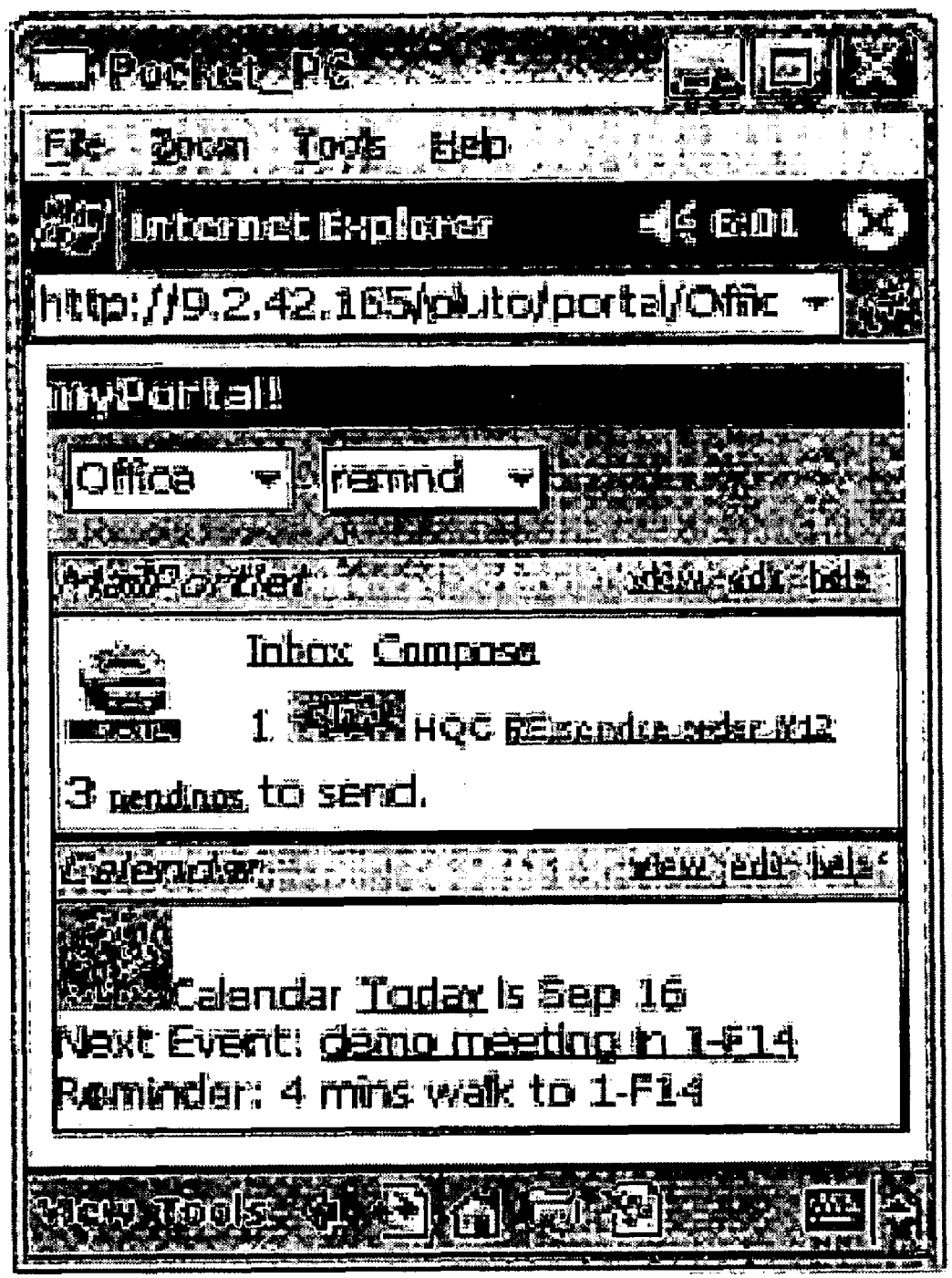
FIG. 20 illustrates a java applet that may be launched in response to selecting an application appearing as a result.

In one implementation, results may be returned to a "text only" application that has already been launched (e.g., a text message being generated). Alternatively or in addition, applications may be launched responsive to entry of a sequence of ambiguous characters. And, selecting a result may launch a rich array of applications, such as a multimedia application or a geolocation service. For example, FIG. 20 illustrates a java applet that may be launched in response to selecting an application appearing as a result.

Other examples of results that may be retrieved may include, but are not limited to, phone numbers and/or keywords. Clicking on a result with a phone number may allow a phone call to be placed. The phone call may be bridged to a telephone network or connected to an IP phone (e.g., a virtual phone application residing in a dialed user's PC).

The results and additional information descriptive of results previously returned or selected may be stored on the client 110 and/or the host 130. For example, the most recently accessed results may be cached on the client 110, while a more extensive history of results may be cached on the host 130. The stored results may be accessed and used to analyze and generate results responsive to a user's predictive interest.

To illustrate how stored results may be used to analyze a subsequent character stream, a previous search related to the National Football League (NFL) may generate a series of metadata tags. These metadata tags may be stored in a profile associated with the user. For example, the user searching for NFL-related information may have the metadata tags "NFL", and "Football" added to their user profile. The metadata tags may be used in performing subsequent analysis. Thus, when the user types in "Falcons", additional metadata tags related to the multiple meanings of "Falcons" may be generated and analyzed using the metadata tags previously generated. Examples of metadata tags related to Falcons may include terms such as "NFL", "Audubon Society", and "Sport of Kings". The metadata tags from the previous search on the NFL may be compared against metadata tags generated by entering "Falcons". By correlating the results from a previous search with known metadata tags for the term of interest, results that are likely to be more responsive to the predicted interest of a user are returned. In this case, correlating the results of the previous search with the present search generates results related to the NFL's Atlanta Falcons.

The results from multiple users may be used to determine results that are more responsive to a predictive interest of a different user. For example, if most of the users entering "Falcons" as a character stream are determined to be interested in the NFL, a default rule may be created and adopted that returns results related to the NFL sports team in response to "Falcons." A finer analysis may be performed by suspending the default rule when the user has a profile or has expressed an interest in other, non-sports aspects of "falcons" or used modifiers such as "birds", "Audubon Society", or "kestrels".

Although many of the operations were described with respect to an alphanumeric keypad, the operations also may be used in support of other input entry systems including ideographic, stylic entry, and handwriting recognition-oriented systems. For example, handwritten strokes or stroke categories may be mapped to the available keys so that a user may enter strokes for a desired character in a specific order. In another example, a phonetic alphabet is mapped to the keys so that a user may enter a phonetic spelling of the desired character. The user then may locate and select the desired character from among the several that may relate to the input sequence.

Analyzing a sequence of ambiguous characters may incorporate results from prior analysis. For example, a host may determine that two or more ideographic characters are often needed to define a term, word or phrase. A host may recognize that the sequence of ambiguous characters likely represents a portion of a phrase. In recognizing that the sequence of ambiguous represents a portion of a phrase, the host may reduce the requirement to analyze and/or select subsequent characters, ideographs, or words individually.

In one implementation, local analysis is performed before the sequence of ambiguous characters is exchanged with the host. For example, if a user enters "liulles" and the client does not have a desired term in a client vocabulary or dictionary, the client may exchange "Dulles" with the host. In another implementation, results retrieved from a host may be selectively or automatically loaded to a local dictionary on the client. For example, the client may reserve a specified amount of storage for the most recently retrieved results and/or the most popular results.

In one implementation where handwriting recognition is being used, a client may initially resolve a user input to a character. A sequence of one or more characters then may be exchanged the host. The host may be configured to perform analysis on characters related to the characters that have been received so that results may be returned even where a user input was incorrectly recognized. For example, a client with a touch screen that uses handwriting recognition may incorrectly recognize a first handwritten "e" character as a "c" character. The client may exchange the "c" with a host. The host may modify the analysis in response to receiving an indication that the client is using handwriting recognition to account for entry of errors during the preliminary handwriting recognition. As a result, the host may return results responsive to the first handwritten character represented as an ambiguous character for "c" and "e".

A client may submit attributes and/or modifiers indicating so that a host may provide results more likely to be responsive to a user's predicted interest. In one implementation, the client indicates that the client is a wireless phone with a reduced-entry keypad and limited display. As a result, the host may be configured to provide results tailored to the limited display and/or related to mobile use. In one example, a host may provide results related to the application most commonly accessed by mobile users (e.g., directory services and mapping applications. In another example, a host configured to include mapping content in results may be configured to "favor" results proximate to a user's location.

Results may be retrieved from multiple databases, including databases from different languages. A host may detect that a term from a different language has been selected, and, as a result, return results responsive to the different language that has been detected. For example, a host may offer German matches related to a sequence of ambiguous characters. In response to detecting that a user has selected a German term, the host may be configured to perform relate subsequent input in the sequence of ambiguous characters to German terms, such as German automobile manufacturers.

Spelling correction agents may recognize that a user has likely entered a typographical mistake. In response, spelling correction agents may correct the default interpretation by altering the input sequence on the client and/or by retrieving corrected results. For example, the "entered" sequence from an autocorrecting touch screen keyboard may be analyzed and displayed on a client, but a "spelling corrected" interpretation may be used when the sequence of ambiguous characters are exchanged with a host.

A content provider may establish a "preferred" area of content from which results should be initially returned. For example, a wireless carrier may enable access to content on specialized hosts configured to serve content to wireless phones. The specialized hosts may selectively enable access to content based on a status of a subscription and/or reconfigure content hosted elsewhere for better display on a wireless phone.

The client may include nonvisual input and display systems. In one implementation, a wireless phone may include a text-to-speech engine that generates an audio signal related to each result. In another implementation, the wireless phone may include a wireless phone that uses voice inputs to rapidly navigate among results that have been returned. For example, a voice recognition engine on a wireless phone may experience difficulty in resolving a large vocabulary and/or a particular dialect. A user may rely upon a reduced entry keypad to initially enter terms that should be used. After rendering some terms in the results, the voice recognition system may be activated and used to select from among the results that have been rendered.

In one implementation, the client selectively activates a communications interface to a wireless network in response to receiving a threshold number of characters, or in response to receiving a threshold number of ambiguous characters. In another implementation, the client accesses an "always on" communications interface. In yet another implementation, the client accesses a low bandwidth communications interface to exchange the sequence of ambiguous characters and/or low bandwidth results. If the user is accessing results that are more resource intensive, such as a sample of a ring tone, a higher bandwidth communications interface may be established.

Multiple levels of disambiguation may be performed. For example, a host may analyze an ambiguous character stream and resolve the ambiguous character stream to one or more terms. For example, a "24737" may be resolved to "BIRDS". The terms then may be further resolved to reflect ambiguous meaning for terms. For example, "24737" may be resolved to "Baltimore Orioles" for users determined to be baseball fans in the greater Baltimore region. In implementation, the additional disambiguation is performed after resolving "24737" directly to "BIRDS". In another implementation, "24737" may be directed resolved to "Baltimore Orioles" when a host database supports a more detailed level of user profiling and a sports vocabulary.

What is claimed is:

1. A computer-implemented method of presenting information to a user in which a computer system initiates execution of software instructions stored in memory, the computer-implemented method comprising:

receiving one or more ambiguous characters via a reduced-entry keypad of a wireless phone, the one or more ambiguous characters received as a sequence of numbers input through the reduced-entry keypad as part of a keyword search, each respective ambiguous character being a number that may be resolved to one of at least two disambiguated characters;

exchanging at least one of the ambiguous characters with a host by transmitting the sequence of numbers across a wireless network, the host being a server separate from the wireless phone;

receiving, from the host, results that reflect disambiguated terms as part of search results related to the ambiguous characters exchanged with the host;

rendering the results in a display of the wireless phone to enable identification of which of the disambiguated terms will be used upon a received selection of an aspect of the results;

enabling selection of the aspect of the results to effect use of a corresponding one of the disambiguated terms; and wherein exchanging the at least one of the ambiguous characters with the host includes:

correlating information learned about the user entering the sequence of numbers, the information learned including metadata tags stored in a profile associated with the user, and geographical location information identifying a geographical location of the wireless phone;

modifying the sequence of numbers to instruct the host to return results relating to the information learned about the user;

analyzing the sequence of numbers using geographical location information identifying a geographical location of the wireless phone; and correlating results from a previous search with known metadata tags for a given term of interest.

2. The computer-implemented method of claim 1 further comprising:

enabling the user to enter a special character;

using the special character to select a subset from within the results;

rendering the subset; and wherein enabling the user to enter the special character includes enabling the user to select a "#" key, a "*" key, or an arrow button as a mechanism to effect selection of the subset.

3. The computer-implemented method of claim 1 further comprising:

analyzing the one or more ambiguous characters before exchanging the at least one of the ambiguous characters with the host;

rendering the results in response to analyzing the at least one of the ambiguous characters;

enabling the user to interact with the results; and as a result of user interaction with the results, exchanging at least some of the ambiguous characters with the host to update the results.

4. The computer-implemented method of claim 1 further comprising:

determining if a threshold number of ambiguous characters has been received; and exchanging the ambiguous characters upon receipt of the threshold number of ambiguous characters.

5. The computer-implemented method of claim 4 further comprising:

determining if an updated threshold of updated ambiguous characters has been received;

exchanging the updated ambiguous characters upon receipt of the updated threshold of ambiguous characters;

receiving updated results from the host; and rendering the updated results.

6. The computer-implemented method of claim 4 wherein establishing communications with the host includes activating an inactive communications channel.

7. The computer-implemented method of claim 4 wherein establishing communications with the host includes accessing an active communications channel.

8. The computer-implemented method of claim 4 further comprising:
   establishing communications with the host upon receipt of the threshold number of ambiguous characters; and
   exchanging the ambiguous characters when communications have been established.

9. The computer-implemented method of claim 4 further comprising:
   establishing communications with the host upon receipt of the threshold number of ambiguous characters and nonambiguous characters; and
   exchanging the ambiguous characters and the nonambiguous characters when communications have been established.

10. The computer-implemented method of claim 4, wherein receiving the one or more ambiguous characters includes:
    receiving the one or more ambiguous characters in a keyword retrieval field of a web browser application;
    wherein rendering the results includes displaying a drop down window adjacent to the keyword retrieval field while the user inputs the ambiguous characters, the drop down window displaying likely results for the ambiguous characters;
    updating the displayed likely results upon receiving additional ambiguous characters from the user; and
    retrieving similar results related to the predicted meaning of the disambiguated terms.

11. The computer-implemented method of claim 1 further comprising:
    receiving nonambiguous characters; and
    exchanging nonambiguous characters with the host.

12. The computer-implemented method of claim 1 wherein receiving the ambiguous characters includes receiving only ambiguous characters.

13. The computer-implemented method of claim 1 wherein receiving the ambiguous characters includes receiving handwritten input resulting from a handwriting recognition system.

14. The computer-implemented method of claim 1 wherein receiving the ambiguous characters includes receiving an indication of a handwritten stroke in an ideographic language.

15. The computer-implemented method of claim 1, further comprising:
    analyzing the ambiguous characters;
    based on analysis of the ambiguous characters, generating results that identify several user applications that are related to the ambiguous characters;
    rendering the results in a manner enabling the user to perceive which one of the several user applications will be launched in response to user selection of a corresponding aspect of the results; and
    enabling the user to select one aspect of the results to effect a launch of the user application corresponding to the selected aspect of the results.

16. The computer-implemented method of claim 15 further comprising:
    using a wireless phone with a reduced-entry keypad to enter the one or more ambiguous characters;
    relating the ambiguous characters to disambiguated terms and identifying the several user applications based on the disambiguated terms;
    rendering the results in a display on the wireless phone with an indication of an application that will be launched upon user selection of the aspect of the results corresponding to the user application; and
    enabling the user to use a reduced-entry keypad of the wireless phone to select one aspect of the results corresponding to one of the several user applications.

17. The computer-implemented method of claim 16 further comprising:
    based upon the one or more received ambiguous characters, identifying a first corresponding disambiguated result that is attainable through invocation of a browser application;
    based upon the one or more received ambiguous characters, identifying a second corresponding disambiguated result that is attainable through invocation of a directory service application;
    rendering the first corresponding disambiguated result and the second corresponding disambiguated result; and
    enabling selection by the user of the first corresponding result or the second corresponding result.

18. The computer-implemented method of claim 17 wherein identifying the first corresponding disambiguated result that is attainable through invocation of the browser application includes identifying the first corresponding disambiguated result that is attainable through invocation of a browser application that is configured to render content using a markup language other than a Hyper Text Markup Language (HTML).

19. The computer-implemented method of claim 17 further comprising:
    wherein identifying the first corresponding disambiguated result that is attainable through invocation of the browser application includes enabling the user to access different applications through the browser application; and
    wherein enabling the user to access the different applications through the browsing application includes enabling the user to access at least one of a mapping service, a web browsing service, an advertising service, an instant messaging service, and an email service.

20. The computer-implemented method of claim 16 wherein rendering the results in a display on the wireless phone with the indication of the application includes rendering the results with an icon representative of the application.

21. The computer-implemented method of claim 15 further comprising relating the ambiguous characters to disambiguated terms and identifying the several user applications based on the disambiguated terms.

22. The computer-implemented method of claim 1, wherein exchanging the at least one of the ambiguous characters with the host includes:
    exchanging the sequence of numbers upon receiving an amount of numbers in the sequence that meets an initial predetermined threshold amount of numbers; and
    exchanging subsequently received numbers, received as part of the sequence of numbers, after receiving an amount of the subsequently received numbers above a second predetermined threshold amount of numbers.

23. The computer-implemented method of claim 22, wherein exchanging the at least one of the ambiguous characters with the host includes:
    transmitting updates to the host upon receiving the subsequently received numbers, and the transmitting occurring after detecting that user inactivity in entering the sequence of numbers exceeds a predetermined period of time.

24. The computer-implemented method of claim 22, wherein exchanging the at least one of the ambiguous characters with the host includes:
    sending the subsequently received numbers to the host without resending previously sent numbers of the sequence of numbers, and without receiving a completion input from the user that indicates a completion of the sequence of numbers;

upon receiving the subsequently received numbers in the sequence of numbers, and without receiving the completion input, determining that no relevant results exist; and upon determining that no relevant results exist, the host interfacing with the client to notify that that no relevant results exist and to prevent additional updates from being exchanged.

25. The computer-implemented method of claim 24, further comprising:

rendering word stems of potential results, and presenting an interface for the user to step through likely word stems and to select a given word stem.

26. The computer-implemented method of claim 1, wherein rendering the results includes displaying search results with identified word stems displayed as bold text within the search results.

27. The computer-implemented method of claim 1, further comprising:

rendering word stems of potential results, and presenting an interface that enables viewing and selection of likely word stems and to select a given word stem.

28. The computer-implemented method of claim 1, wherein exchanging the at least one of the ambiguous characters with the host includes:

exchanging the sequence of numbers upon receiving an amount of numbers in the sequence that meets an initial predetermined threshold amount of numbers;

exchanging subsequently received numbers, received as part of the sequence of numbers, after receiving an amount of the subsequently received numbers above a second predetermined threshold amount of numbers;

sending the subsequently received numbers to the host without resending previously sent numbers of the sequence of numbers, and without receiving a completion input from the user that indicates a completion of the sequence of numbers;

upon receiving the subsequently received numbers in the sequence of numbers, and without receiving the completion input, determining that no relevant results exist; and upon determining that no relevant results exist, the host interfacing with the client to indicate that that no relevant results exist.

29. The computer-implemented method of claim 1, wherein exchanging the at least one of the ambiguous characters with the host includes:

exchanging the sequence of numbers upon receiving an amount of numbers in the sequence that meets an initial predetermined threshold amount of numbers; and exchanging subsequently received numbers, received as part of the sequence of numbers, after receiving input indicating that results rendered in the display of the wireless phone have been cycled through, for possible selection, more than a predetermined threshold number of times.

30. A computer program on a non-transitory computer storage medium configured to present information on a display of a device to a user, the computer program comprising:

an input code segment structured and arranged to receive, through use of one or more keys of the device, one or more ambiguous characters via a reduced-entry keypad of a wireless phone, the one or more ambiguous characters received as a sequence of numbers input through the reduced-entry keypad as part of a keyword search, each respective ambiguous character being a number that may be resolved to one of at least two disambiguated characters;

an exchanging code segment structured and arranged to exchange at least one of the ambiguous characters with a host by transmitting a sequence of numbers across a wireless network, the host being a server separate from the wireless phone, the exchanging code segment further structured and arranged to:

correlate information learned about the user entering the sequence of numbers, the information learned including metadata tags stored in a profile associated with the user, and geographical location information identifying a geographical location of the wireless phone;

modify the sequence of numbers to instruct the host to return results relating to the information learned about the user;

analyze the sequence of numbers using geographical location information identifying a geographical location of the wireless phone; and correlate results from a previous search with known metadata tags for a given term of interest;

a receiving code segment structured and arranged to receive, from the host, results that reflect disambiguated terms as part of search results related to the ambiguous characters exchanged with the host;

a rendering code segment structured and arranged to render, using the display of the device, the results in a display of the wireless phone to enable identification of which of the disambiguated terms will be used upon a received selection of an aspect of the results; and an enabling code segment structured and arranged to enable selection of, through use of the one or more keys of the device, the aspect of the results to effect use of a corresponding one of the disambiguated terms.

31. A computer-implemented method of presenting information to a user in which a computer system initiates execution of software instructions stored in memory, the computer-implemented method comprising:

receiving one or more ambiguous characters via a reduced-entry keypad of a wireless phone, the one or more ambiguous characters received as a sequence of numbers input through the reduced-entry keypad as part of a keyword search, each respective ambiguous character being a number that may be resolved to one of at least two disambiguated characters;

exchanging at least one of the ambiguous characters with a host by transmitting the sequence of numbers across a wireless network, the host being a server separate from the wireless phone;

receiving, from the host, results that reflect disambiguated terms as part of search results related to the ambiguous characters exchanged with the host;

rendering the results in a display of the wireless phone to enable identification of which of the disambiguated terms will be used upon a received selection of an aspect of the results;

enabling selection of the aspect of the results to effect use of a corresponding one of the disambiguated terms; and wherein exchanging the at least one of the ambiguous characters with the host includes:

exchanging the sequence of numbers upon receiving an amount of numbers in the sequence that meets an initial predetermined threshold amount of numbers; and exchanging subsequently received numbers, received as part of the sequence of numbers, after receiving input indicating that results rendered in the display of the wireless phone have been cycled through, for possible selection, more than a predetermined threshold number of times.

32. The computer-implemented method of claim 31, further comprising:
   rendering word stems of potential results, and
   presenting an interface that enables viewing and selection of likely word stems and to select a given word stem.

33. The computer-implemented method of claim 31, wherein exchanging the at least one of the ambiguous characters with the host includes:
   transmitting updates to the host upon receiving the subsequently received numbers, the transmitting occurring after detecting that user inactivity in entering the sequence of numbers exceeds a predetermined period of time.

34. The computer-implemented method of claim 31, further comprising:
   analyzing the ambiguous characters;
   based on analysis of the ambiguous characters, generating results that identify several user applications that are related to the ambiguous characters;
   rendering the results in a manner enabling the user to perceive which one of the several user applications will be launched in response to user selection of a corresponding aspect of the results; and
   enabling the user to select one aspect of the results to effect a launch of the user application corresponding to the selected aspect of the results.

* * * * *